US009317987B2

(12) United States Patent
Cleveland et al.

(10) Patent No.: US 9,317,987 B2
(45) Date of Patent: Apr. 19, 2016

(54) SAFE WITH CONTROLLABLE DATA TRANSFER CAPABILITY

(75) Inventors: Terri P. Cleveland, Holley, NY (US); Torsten Rhode, Canandaigua, NY (US); Kelvin H. Wildman, Honeoye Falls, NY (US); Scott Osiecki, Skaneateles, NY (US); James A. McLean, Spencerport, NY (US)

(73) Assignee: John D. Brush & Co., Inc., Rochester, NY (US)

( * ) Notice: Subject to any disclaimer, the term of this patent is extended or adjusted under 35 U.S.C. 154(b) by 1113 days.

(21) Appl. No.: 12/161,867

(22) PCT Filed: Jan. 24, 2007

(86) PCT No.: PCT/US2007/002083
§ 371 (c)(1),
(2), (4) Date: Jul. 23, 2008

(87) PCT Pub. No.: WO2007/087417
PCT Pub. Date: Aug. 2, 2007

(65) Prior Publication Data
US 2009/0165682 A1      Jul. 2, 2009

Related U.S. Application Data

(60) Provisional application No. 60/761,980, filed on Jan. 25, 2006.

(51) Int. Cl.
*G05B 19/00* (2006.01)
*G08B 13/14* (2006.01)
(Continued)

(52) U.S. Cl.
CPC ............ *G07C 9/00912* (2013.01); *G06F 21/86* (2013.01); *G06F 21/88* (2013.01); *Y10T 70/625* (2015.04); *Y10T 70/7073* (2015.04)

(58) Field of Classification Search
CPC ................................. G05B 19/00; G08B 13/14
USPC ............ 340/5.1, 693, 542; 109/23; 710/1, 62; 70/263, 278.2; 700/79; 370/342; 455/41.2; 364/184; 711/164; 361/683, 361/687, 724
See application file for complete search history.

(56) References Cited

U.S. PATENT DOCUMENTS 4,645,613 A   2/1987   Harvey et al.
4,818,986 A   4/1989   Bauman
(Continued)

FOREIGN PATENT DOCUMENTS

GB    2 242 304 A    9/1991
JP    61-235963      10/1986
(Continued)

OTHER PUBLICATIONS

Daveson, Luke, "Examiner's First Report on Patent Application No. 2007208215," dated Jan. 31, 2011 for Australian Patent App. No. 2007208215, Australia.
(Continued)

*Primary Examiner* — Nam V Nguyen
(74) *Attorney, Agent, or Firm* — Woods Oviatt Gilman LLP

(57) ABSTRACT

A safe including a safe controller coupled to a data transfer port is provided. The safe controller is configured to selectively enable device data to pass through the data transfer port when a valid code is received by the safe controller. A system for controlling data communications with an internal device in a safe is also provided. The system includes an external computing device configured to execute a series of instructions, and a safe. The safe includes a data transfer port coupled to the external computing device and the internal device. The safe also includes a safe controller coupled to the data transfer port, wherein the safe controller is configured to selectively enable communication between the external computing device and the internal device when a valid code is received by the safe controller.

35 Claims, 22 Drawing Sheets

(51) Int. Cl.
  *H04K 1/00* (2006.01)
  *A47B 96/00* (2006.01)
  *E05C 3/00* (2006.01)
  *G07C 9/00* (2006.01)
  *G06F 21/86* (2013.01)
  *G06F 21/88* (2013.01)

(56) References Cited

U.S. PATENT DOCUMENTS

| | | | |
|---|---|---|---|
| 4,985,695 A | | 1/1991 | Wilkinson et al. |
| 5,164,718 A | | 11/1992 | Cedergren |
| 5,295,447 A | | 3/1994 | Robbins et al. |
| 5,397,237 A | | 3/1995 | Dhont et al. |
| 5,479,341 A | | 12/1995 | Pihl et al. |
| 5,555,156 A | * | 9/1996 | Decante .................. 361/679.57 |
| 5,623,597 A | | 4/1997 | Kikinis |
| 5,725,081 A | | 3/1998 | Meeker |
| 5,774,058 A | | 6/1998 | Henry et al. |
| 5,805,074 A | * | 9/1998 | Warren et al. .................. 340/5.54 |
| 5,815,557 A | * | 9/1998 | Larson .................. 340/5.64 |
| 5,918,720 A | | 7/1999 | Robinson et al. |
| 6,040,771 A | | 3/2000 | Kim |
| 6,067,530 A | | 5/2000 | Brooks, Jr. et al. |
| 6,158,833 A | | 12/2000 | Engler |
| 6,269,966 B1 | | 8/2001 | Pallo et al. |
| 6,367,017 B1 | * | 4/2002 | Gray .................. 726/9 |
| 6,660,950 B2 | * | 12/2003 | Fonseca .................. 200/51 R |
| 6,724,303 B2 | * | 4/2004 | McGunn et al. .................. 340/521 |
| 6,752,092 B2 | | 6/2004 | Beattie et al. |
| 6,788,209 B2 | * | 9/2004 | Cothern et al. .................. 340/606 |
| 6,885,281 B2 | | 4/2005 | McGunn et al. |
| 7,211,742 B2 | | 5/2007 | Moore et al. |
| 7,212,098 B1 | * | 5/2007 | Trent et al. .................. 340/5.3 |
| 7,232,197 B2 | * | 6/2007 | Davis .................. 312/409 |
| 7,291,784 B2 | | 11/2007 | Moore et al. |
| 7,545,639 B2 | | 6/2009 | Ridge |
| 2002/0147598 A1 | | 10/2002 | Smith et al. |
| 2002/0147692 A1 | | 10/2002 | Smith et al. |
| 2004/0012316 A1 | | 1/2004 | Davis |
| 2004/0039920 A1 | * | 2/2004 | Kim et al. .................. 713/185 |
| 2004/0064631 A1 | | 4/2004 | Kishon et al. |
| 2005/0144996 A1 | | 7/2005 | McGunn et al. |
| 2005/0204787 A1 | | 9/2005 | Ernst et al. |
| 2006/0060114 A1 | | 3/2006 | Walker |
| 2008/0175983 A1 | | 7/2008 | Moore |
| 2009/0050365 A1 | | 2/2009 | Moore et al. |
| 2009/0179536 A1 | | 7/2009 | Moore |
| 2009/0219679 A1 | | 9/2009 | Moore et al. |

FOREIGN PATENT DOCUMENTS

| | | |
|---|---|---|
| JP | 2000-194448 | 7/2000 |
| JP | 2000285024 A | 10/2000 |
| JP | 2002-373030 | 12/2002 |
| JP | 2004-62477 | 2/2004 |
| JP | 2004-348654 | 12/2004 |
| JP | 2005226220 A | 8/2005 |
| JP | 2005-346649 | 12/2005 |
| JP | 2005346263 | 12/2005 |
| WO | WO 03/034365 A1 | 4/2003 |
| WO | WO 2006/080747 A1 | 8/2006 |

OTHER PUBLICATIONS

Moritsugu, Akira, Office Action, Japanese Patent Appln No. 2008-552416, May 30, 2013, 9 pages.
Moritsugu, Ken, Report of Reexamination Before Appeal, Japanese Patent Application No. 2008-552416, Mar. 18, 2015, 7 pages.
Moritsugu, Akira, Office Action, Japanese Patent Application No. 2008-552416, May 30, 2013, 9 pages.

* cited by examiner

SAFE WITH CONTROLLABLE DATA TRANSFER CAPABILITY

CROSS-REFERENCE TO RELATED APPLICATIONS

This application is a National Stage filing under 35 U.S.C. §371 of International Application No. PCT/US2007/002083, filed Jan. 24, 2007, which in turn claims priority to U.S. Provisional Patent Application No. 60/761,980 entitled, "Safe Having Data Transfer Capabilities with an External Computing Device," filed Jan. 25, 2006. The International Application No. PCT/US2007/002083 and U.S. Provisional Patent Application No. 60/761,980 are hereby incorporated by reference in their entirety.

TECHNICAL FIELD

The present invention generally relates to safes, and more particularly to safes having one or more data transfer capabilities.

BACKGROUND OF THE INVENTION

Most present day safes are designed to operate without external connections. As a result, in order to store electronic data in such a safe, the data must first be put onto a data storage device, the safe must be opened, the data storage device must be placed into the safe, and then the safe can be locked again. While such actions may be acceptable when storing paper documents or other tangible valuables, these actions are cumbersome at best when trying to protect electronic data and a user may not try to protect their electronic data due to the inconvenience involved.

Computer systems are designed to take advantage of the flexibility and ease of adding to, modifying, and/or deleting electronic data. Therefore, while someone might wish to protect their electronic data by placing it within a safe, with many present day safes, they are limited to storing a placeholder version of the data from time to time, because it is not practical to repeatedly open and close the safe to file away a new copy of the electronic data or to gain access to a storage device stored in the safe.

In order to help alleviate this situation, some safes have been designed with pass-through ports or cables to allow data and power to be supplied to the interior of the safe. This type of safe allows an external hard drive to be placed into the safe, connected to the pass-through port, and locked within the safe. An external computer can then connect to the exterior side of the pass-through port and freely access the hard drive stored therein without having to open and close the safe's door. In such a situation, data backups to the storage device protected within the safe are much more likely because they can be automated by the external computer, and no repetitive steps are needed by the user. Unfortunately, the convenience which appears to make this type of safe appealing can be a major security risk. Anyone with access to the outside of such a safe can connect many different types of computers to the exterior side of the pass-through port and have free access to browse, delete, copy, modify, or steal the data therein. The situation is analogous to having a large peek hole into a safe full of papers, whereby just for looking down into the peek hole, the contents of the safe may be revealed or stolen.

Moreover, existing safes also provide for transmission of data from an external data source located outside a safe to a data storage device located inside the safe using an infrared communications link. However, the use of an infrared communications link has a number of disadvantages when used to transmit data to a storage device located inside a safe. For example, the use of an infrared communications link to transfer data is extremely time consuming and therefore inconvenient for a user that is transferring a relatively large amount of data to the device located inside the safe. In addition, the use of an infrared communications link requires a direct line of sight between the external data source and the safe which includes the data storage device. Every time a user would like to transfer data to the data storage device inside the safe, the safe will need to be placed in a position that can receive infrared communications from the external data source. Exposing the safe may be inconvenient given that safe are typically placed in a concealed location that is not easily accessible, and contrary to the general desire to keep a safe in a hidden location.

Therefore, it would be advantageous to have a safe which can protect electronic data stored within the safe from unauthorized access while still enabling convenient data access for authorized users. It would also be advantageous to provide a system that allows device data to be conveniently and quickly transferred from an external data source to a device located inside a safe without exposing the safe's concealed location.

SUMMARY OF THE INVENTION

A safe having a data transfer port and a safe controller coupled to the data transfer port is provided. The safe controller is configured to selectively enable device data to pass through the data transfer port when a valid code is received by the safe controller.

A system for controlling data communications with an internal device in a safe is also provided. The system has an external computing device configured to execute a series of instructions stored on a computer readable medium, the series of stored instructions includes safe application software. The safe may be included in the system and have a data transfer port coupled to the external computing device and the internal device. The safe also may have a safe controller coupled to the data transfer port, wherein the safe controller is configured to selectively enable communication between the external computing device and the internal device when a valid code is received by the safe controller.

A method of unlocking a data transfer port in a safe is further provided. A connection between a safe controller in the safe and an external computing device is established. Appropriate data is entered into a safe application program running on the external computing device. A valid code is transmitted to the safe controller from the external computing device in response to the entering of the appropriate data. The data transfer port is enabled in the safe by the safe controller in response to receiving the valid code thereby allowing device data to pass through the data transfer port.

Another method of unlocking a data transfer port in a safe is provided. A connection is established between a safe controller in the safe and an external computing device. Appropriate data is entered into a safe application program running on the computing device. A valid code is transmitted to the safe controller from the external computing device in response to the entering of the appropriate data. The valid code is compared to a signal received from a local input device. The data transfer port is enabled by the safe controller if at least a portion of the valid code and the signal received from the local input device match thereby allowing device data to pass through the data transfer port.

A method for passing data between an external computing device and an internal device inside a safe is provided. A connection is established between a safe controller in the safe and the external computing device. Appropriate data is entered into a safe application program running on the external computing device to encode device data intended for the internal device with a valid code. The encoded data is communicated from the external computing device to the safe controller. The encoded data is decoded. The device data is passed to the internal device stored in the safe based on receipt of the decoded valid code with the device data.

Furthermore, a computer readable medium containing computer executable instructions thereon for passing data between an external computing device and an internal device inside a safe is provided. The computer readable medium includes instructions to establish a connection between a safe controller in the safe and the external computing device. The computer readable medium also includes instructions to communicate a valid code and device data from the external computing device to the safe controller so that the safe controller will direct the device data to an internal device in the safe based on receipt of the valid code.

A system for providing data communications with an internal device located within a safe is provided. The system includes an external computing device and a safe having a data transfer port. The data transfer port is connected to the internal device. The external computing device is adapted to wirelessly communicate device data to the data transfer port, and the data transfer port is adapted to communicate the device data to the internal device.

A method for providing data communications with an internal device located within a safe is also provided. The method includes providing a safe including a data transfer port, connecting the internal device to the data transfer port, wirelessly communicating device data between the data transfer port and an external computing device. and communicating device data between the data transfer port and the internal device. 46.

A system for providing data communications with an internal device is provided. The system includes a safe defining an interior compartment configured for storing the internal device. The system further includes a data transfer port coupled to the safe and configured to be wirelessly connected to an external computing device so that data is wirelessly communicated between the internal device and the external computing device through the data transfer port.

BRIEF DESCRIPTION OF THE DRAWINGS

The above-mentioned and other features and advantages of this invention, and the manner of attaining them, will become appreciated and be more readily understood by reference to the following detailed description of the invention in conjunction with the accompanying drawings, wherein.

Figure 1:
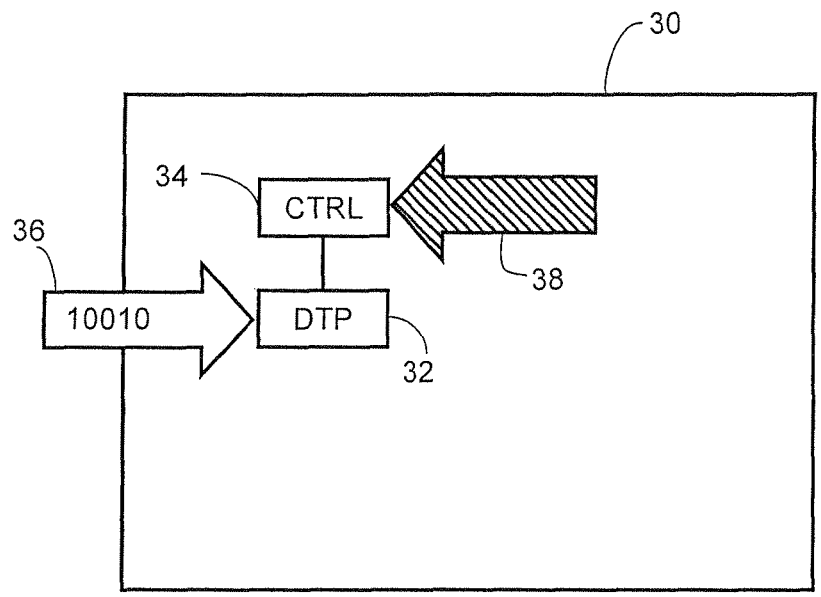
FIG. 1 schematically illustrates one embodiment of a safe having a data transfer port coupled to a safe controller.

It will be appreciated that for purposes of clarity and where deemed appropriate, reference numerals have been repeated in the figures to indicate corresponding features, and that the various elements in the drawings have not necessarily been drawn to scale in order to better show the features.

DETAILED DESCRIPTION OF THE INVENTION

Referring to the drawings in detail, and specifically to FIG. 1, a safe is provided in accordance with an embodiment of the present invention and is designated as reference numeral 30. Safe 30 may be any type of safe, including, but not limited to, a fire-resistant safe, as well as a non-fire-resistant safe, a crush safe, a water-resistant safe, a gun safe, a chest, and a file cabinet safe. In embodiments where safe 30 is a fire-resistant safe, the lid and base of the safe may be a double-walled blow molded unit including fire-resistant insulation in-between inner and outer walls, such as the one shown and described in Sentry's U.S. Pat. No. 6,269,966, which is hereby incorporated by reference in its entirety. The fire-resistant material that may be used in safe 30 may include, but is not limited to, one or more of an insulative mineral wool, a sodium silicate intumescent material, and insulation that is described in Sentry's U.S. Pat. No. 4,645,613, which is hereby incorporated by reference in its entirety. In embodiments where safe 30 is a water-resistant safe, the safe may have one or more gasket seals located at the interface between the lid and the base, such as the one shown in Sentry's U.S. Pat. No. 6,752,092, which is hereby incorporated by reference in its entirety. It should be understood that other embodiments of fire-resistant and water resistant safes may be used in conjunction with the present invention in addition to or in place of the features shown in U.S. Pat. Nos. 6,269,966, 6,752,092, and 4,645,613.

Safe 30 has a data transfer port 32 and a safe controller 34 coupled to the data transfer port 32. Data transfer port 32 is configured to receive device data 36 from an external device positioned outside of safe 30. Examples of device data 36 may include, but are not limited to, hard drive read/write commands and associated data; storage device data; digital camera data, such as photos; digital music data, such as MP3 files; smartphone data, such as contact lists and calendars; operating system backup data; and financial data. Safe controller 34 is configured to selectively enable device data 36 to pass through the data transfer port 32 to an internal device when a valid code 38 is received by safe controller 34. Safe controller 34 may be a microprocessor, a computer, an application specific integrated circuit (ASIC), analog components, digital components, or any number or combination thereof. The valid code 38 may include, but is not limited to, a password, a biometric signature, an encryption key, an encrypted code, a data format, properly encapsulated data, signal bits, or any combination thereof.

For simplicity, the power connections for any such items requiring power are not shown. It should be understood, however, power may be supplied to devices within a safe, for example by passing a power cord through a hole or notch in the safe door or walls for that purpose, by providing a power port through the safe walls with external and internal connections, or by providing the safe with one or more batteries or alternative power sources. Many other types of power configurations for the interior of a safe are known to those skilled in the art and may be selected as desired according to the system and safe at hand.

Data transfer port 32 may utilize any type of physical or wireless connector or physical jack or port, as well as any desired protocol. Some examples of suitable data transfer port 32 connections and protocols include, but are not limited to, Ethernet, RJ-45, serial, USB, firewire, twisted pair, optical, fiber optic, wireless RF, 802.11, BLUETOOTH, CDMA cellular, and GSM cellular. For simplicity, data transfer port 32 will be described as offering only a single connection type and protocol at a time, however, it should be understood that some embodiments may have more than one type of connector and/or protocol associated with data transfer port 32. Furthermore, although the illustrated data paths through data transfer port 32 have been shown in one direction, it should be understood that data transfer port 32 may be enabled to pass data bi-directionally. To simplify the discussion of the operation of safe 30, only a single direction of communication is being illustrated, but it should be understood that two direction communication can be enabled and will be required for many external devices which want to connect to an interior device on the inside of safe 30.

Figure 2:
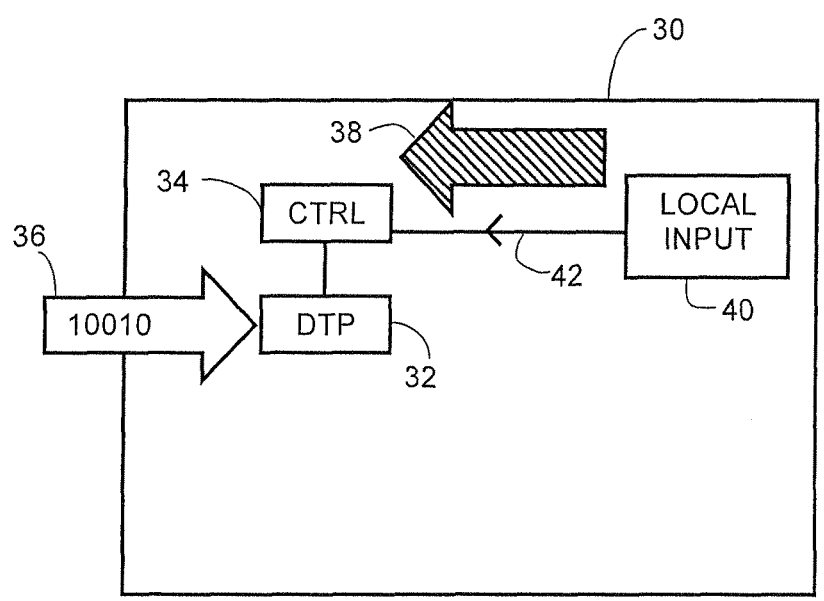
FIG. 2. schematically illustrates the safe of FIG. 1 having one embodiment of a local input device.
Figure 3:
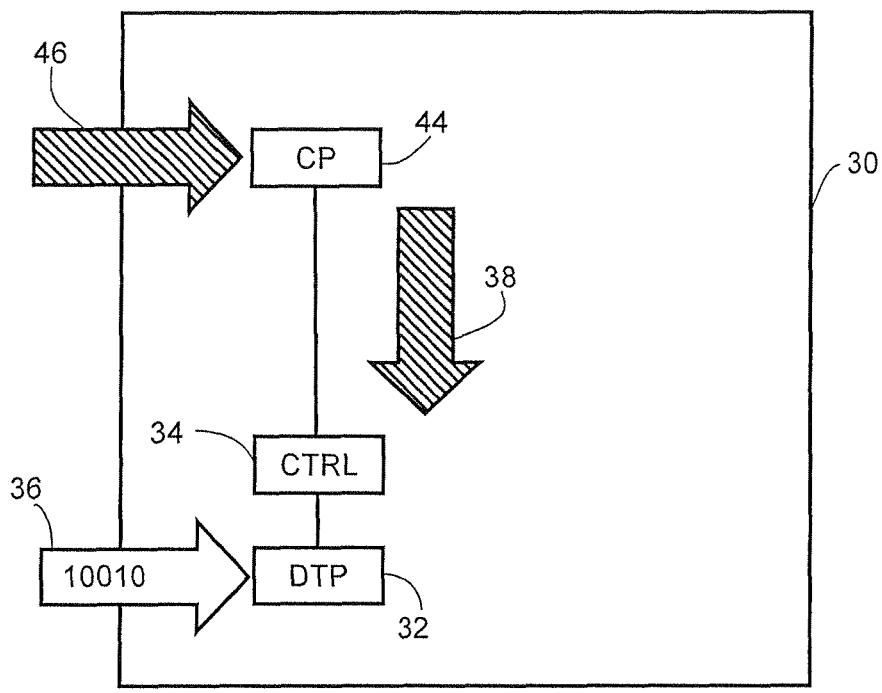
FIG. 3 schematically illustrates one embodiment of a safe having a data transfer port, a safe controller, and a communication port.

In order for safe controller 34 to enable device data 36 to pass through data transfer port 32 to an interior device, valid code 38 must be received by the safe controller 34. FIGS. 2 and 3 schematically illustrate two options for where the valid code 38 may come from. In the embodiment of FIG. 2, safe 30 still has data transfer port 32 coupled to safe controller 34 as in FIG. 1, but a local input device 40 is also coupled to safe controller 34. Examples of local input device 40 which may be coupled to safe controller 34 include, but are not limited to, a key lock having electronic signaling capabilities; a key pad; a remote control sensor; an electronic key reader such as a magnetic reader, a bar code reader, and an RFID tag reader; a physical or resistive combination dial with digital readout; a mechanical key lock; an authentication token, for example, a smart card or a key fob; and a biometric reader such as a fingerprint reader or a retinal scanner. In response to a user interacting with local input device 40, a signal 42 is sent to safe controller 34. If it matches a predetermined criteria, then that signal 42 will be considered valid code 38 which can then cause safe controller 34 to enable device data 36 to pass through data transfer port 32 to a desired interior device.

In the embodiment shown in FIG. 3, safe 30 has data transfer port 32 coupled to safe controller 34 as in FIG. 1, and a communication port 44 coupled to safe controller 34. Communication port 44 may also use any of the types of connectors and/or any of the types of protocols discussed above with regard to data transfer port 32. In this embodiment, data transfer port 32 receives device data 36, which has been discussed above. Communication port 44 receives communication data 46 that can include instructions or other information to be used by safe controller 34. In the case of FIG. 3, communication port 44 receives communication data 46 which includes valid code 38 as part of its incoming data. The valid code 38 can then cause safe controller 34 to enable device data 36 to pass through data transfer port 32 to an interior device.

Figure 4:
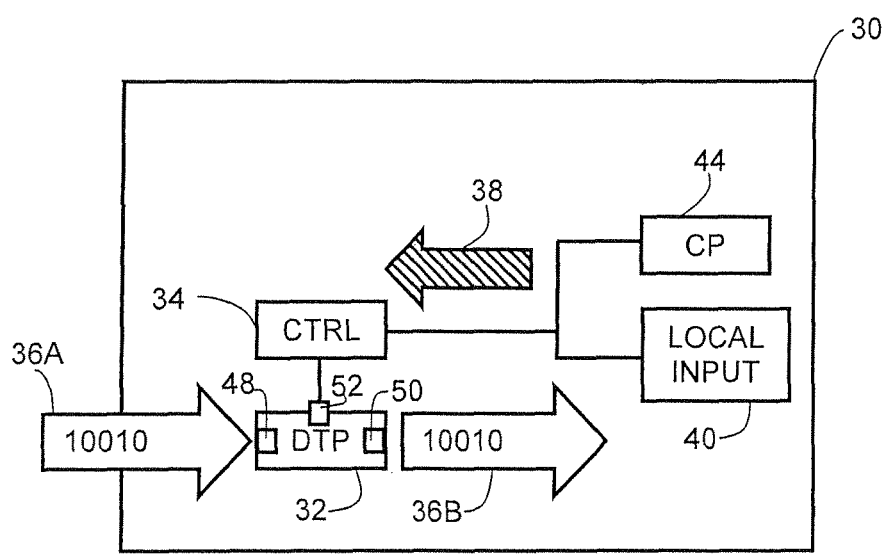
FIGS. 4 and 5 schematically illustrate examples of data paths for embodiments of safes where device data comes over the data transfer port.
Figure 5:
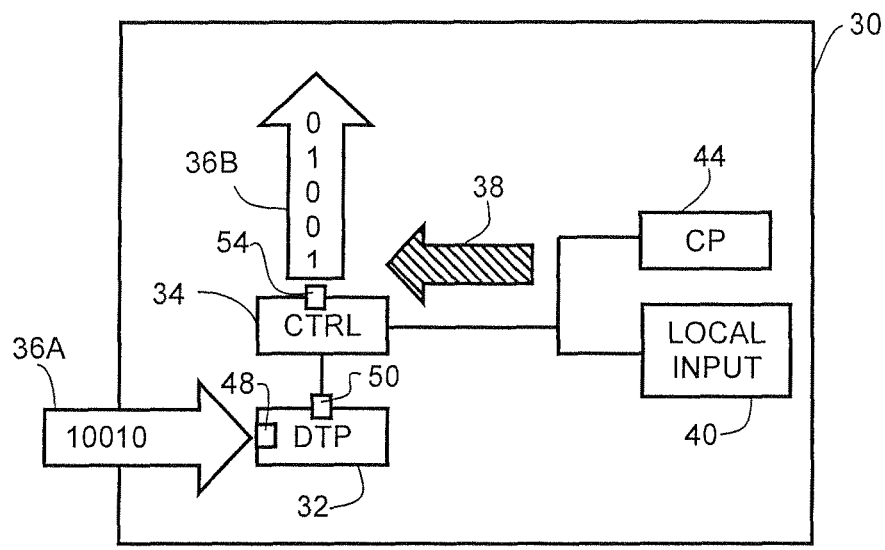

FIGS. 4 and 5 schematically illustrate different embodiments of how device data 36 can pass through data transfer port 32 when valid code 38 is received by safe controller 34. Data transfer port 32 has an external side 48 and an internal side 50. External side 48 of the data transfer port 32 is accessible from outside safe 30 and may be coupled to an external computing device located outside safe 30. In the embodiment of FIG. 4, internal side 50 of data transfer port 32 is accessible from inside safe 30 and may be coupled to an internal device located inside safe 30. Data transfer port 32 also has an activation input 52 which may be enabled by safe controller 34. When safe controller 34 enables activation input 52 in response to valid code 38, then device data 36A will be allowed to pass through data transfer port 32 to become device data 36B available for any devices coupled to internal side 50 of data transfer port 32.

In the embodiment shown in FIG. 5, internal side 50 of data transfer port 32 is coupled to safe controller 34. Safe controller 34 also has an internal data port 54 which may be coupled to an internal device located within safe 30. External side 48 of data transfer port 32 may be coupled to an external computing device located outside safe 30. When safe controller 34 receives valid code 38, then device data 36A will be allowed to pass through data transfer port 32 and through safe controller 34 to internal data port 54 to become device data 36B available for any internal devices coupled to safe controller 34.

Figure 6:
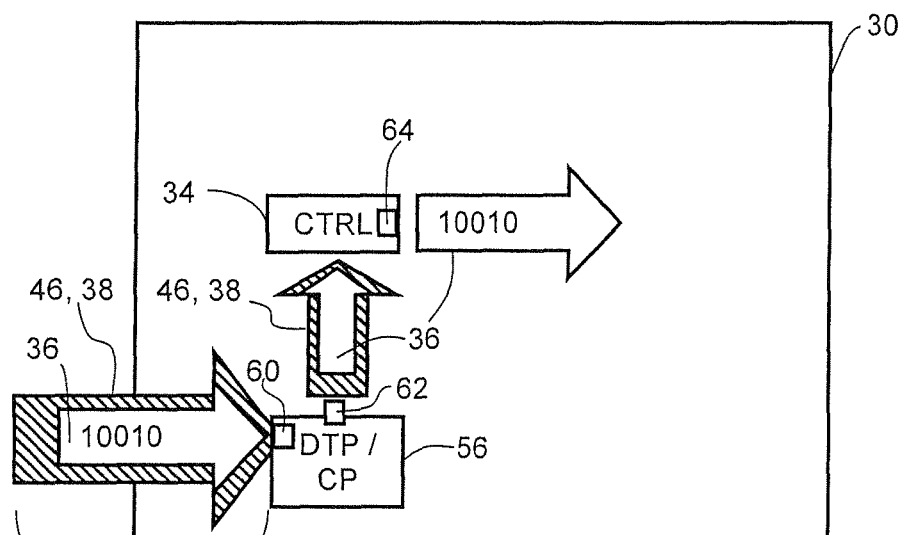
FIGS. 6 and 7 schematically illustrate examples of data paths for embodiments of safes where device data comes over a combined communication port and data transfer port.
Figure 7:
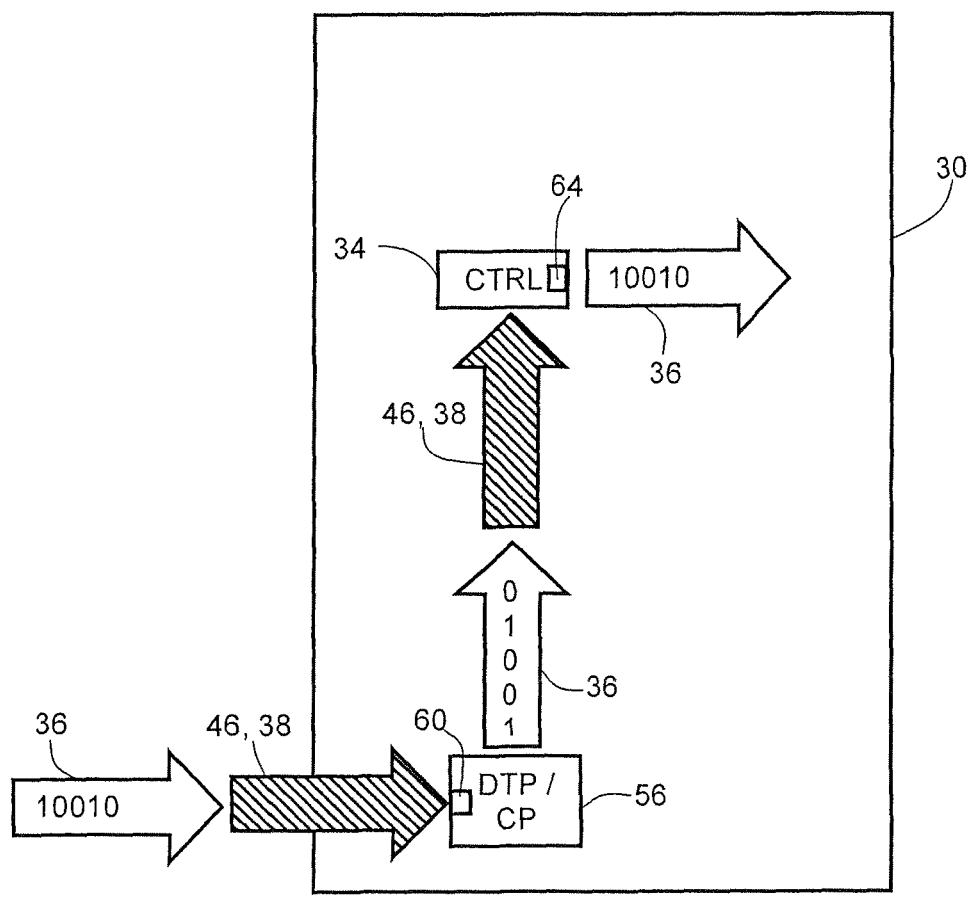

In some embodiments, data transfer port 32 and the communications port 44 as defined herein may be combined into the same physical port. FIGS. 6 and 7 schematically illustrate different embodiments of how device data 36 can pass through the combined data transfer and communications port 56 when valid code 38 is received by safe controller 34. In order to allow two different types of data (device data 36 and communication data 46) to be sent over a single data transfer port 56 the device data 36 and communication data 46 may be encoded together as coded data 58 in some embodiments. Recalling the discussion above, communication data 46 can include valid code 38.

Data transfer port 56 has an external side 60 and an internal side 62. External side 60 of data transfer port 56 may be coupled to an external computing device located outside safe 30. Internal side 62 of data transfer port 56 is coupled to safe controller 34. Safe controller 34 also has an internal port 64 which may be coupled to an internal device located inside safe 30. Safe controller 34 may be configured to decode coded data 58 from external side 60 of data transfer port 56 via internal side 62 to extract any device data 36 from coded data 58 and selectively allow decoded device data 36 to pass through to internal port 64 when valid code 38 is decoded from coded data 58.

The embodiment shown in FIG. 7 operates similarly to the embodiment of FIG. 6, except that valid code 38 and device data 36 are in different packets sent to data transfer port 56 at different times. Safe controller 34 may be configured to enable device data 36 to pass from external side 60 of data transfer port 56 through to internal data port 64 following the receipt of at least one valid code 38.

Other embodiments may use other coding and/or packetizing techniques without falling away from the scope and spirit of the present invention. A variety of packetizing, multiplexing and encoding techniques may be used for moving device data 36 and communication data 46, 38 in a similar fashion over the one data transfer port 56 and fall within the scope of the present invention. It will also be understood that a safe may include data transfer port 56 that is not connected to safe controller 34, wherein the encoded or encrypted device data 36 may pass from an external computing device through data transfer port 56 to an internal device located within the safe 30 without using a valid code.

For convenience in the remainder of the embodiments, combined data transfer port 56 will be used, although it should be kept in mind that other embodiments may have a non-combined data transfer port with a separate communication port, and other embodiments may have a non-combined data transfer port without any communication port. Such embodiments have been discussed above, but again, for simplicity, combined data transfer port 56 will be used for the reminder of the discussions.

FIGS. 8A-8H schematically illustrate embodiments of safe 30 structure and how it may relate to the previously mentioned elements for selectively enabling device data to pass through data transfer port 56. For the embodiments of FIGS. 8A-8G, safe 30 has an outer structure or housing 66 defining an access opening 68 which can be opened to allow access or closed to prevent access by a door 70 moveably or pivotally coupled to outer structure 66, for example, by one or more hinges 71. The schematic illustrations related to FIGS. 8A-8G show safe 30 in a top cross-sectional view. Safe 30 also has at least one lock mechanism 72 which may be selectively couple outer structure 66 and door 70. An example of a suitable lock mechanism 72 includes, but is not limited to, an electronic lock actuator. Lock mechanism 72 may be operatively coupled to safe controller 34 in some embodiments, but need not have to be coupled to the controller 34 at all, for example, in the case of a manual lock.

Figure 8A:
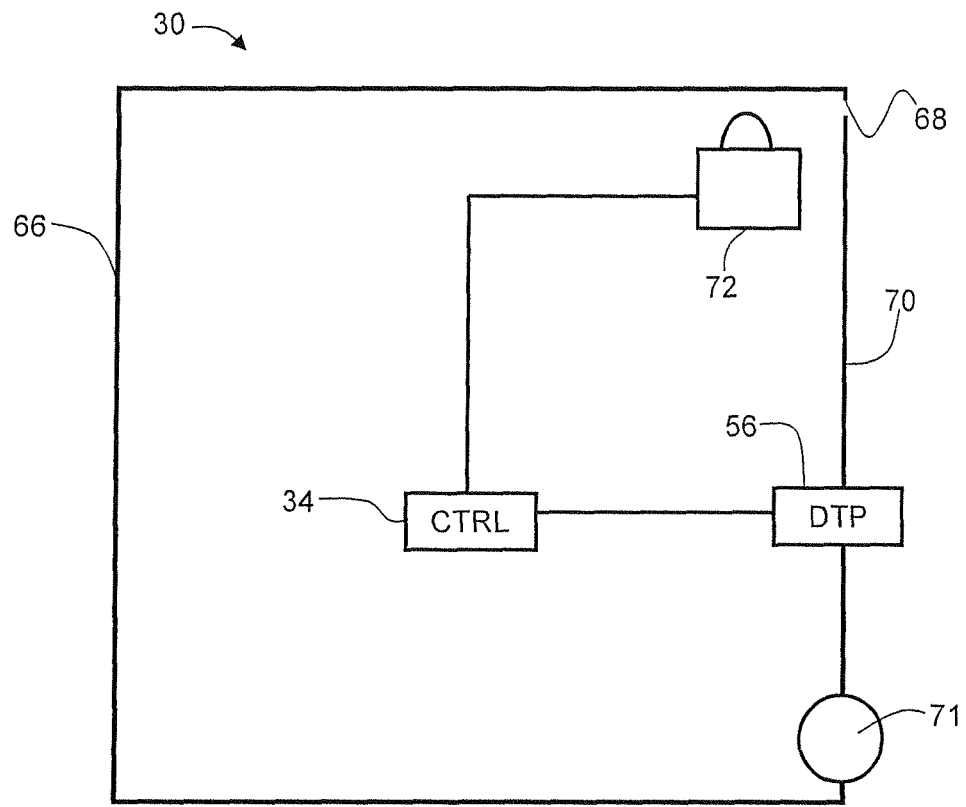
FIGS. 8A-8H schematically illustrate examples of safes with varying embodiments of data transfer ports.

In the embodiment of FIG. 8A, data transfer port 56 passes through door 70. In some embodiments, data transfer port 56 may include a cable connector, such as a male or female cable connector. The cable connector may be substantially flush with the door, be countersunk in the door, protrude from the door, or even include a length of cable which extends the cable connector away from safe 30. In other embodiments, data transfer port 56 can include an optical connector, such as an opto-relay, a fiber optic cable, and/or a photo sensor.

Figure 8B:
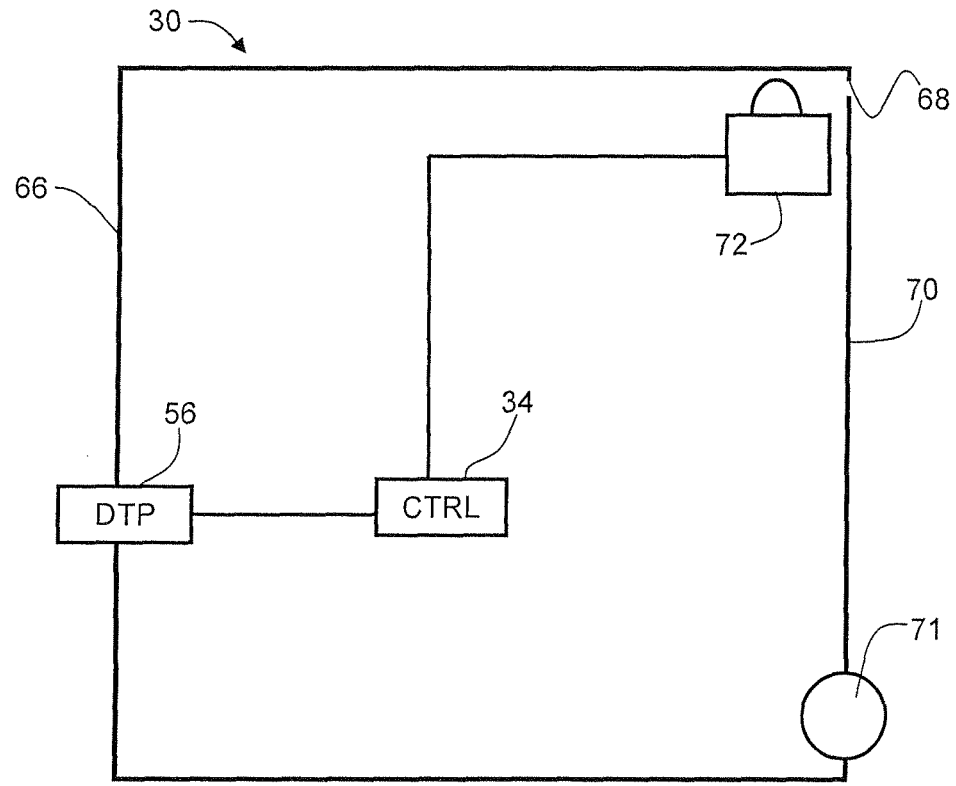

The embodiment shown in FIG. 8B is similar to the embodiment of FIG. 8A, with the exception that data transfer port 56 passes through outer structure 66 of safe 30, rather than passing through door 70. Data transfer port 56 may also pass through the top, bottom, or sides of outer structure 66.

As best seen in FIGS. 8C-8G, data transfer port 56 may include an antenna 74. Using an antenna rather than a cable allows for convenient radio frequency (RF) communications which can make backing up and/or accessing data easier, especially considering that many safes are often placed in out-of-the-way or hidden locations. Having an antenna 74 coupled to data transfer port 56 allows connection with data transfer port 56 by an external computing device anywhere within the wireless range of antenna 74 and external computing device.

Figure 8C:
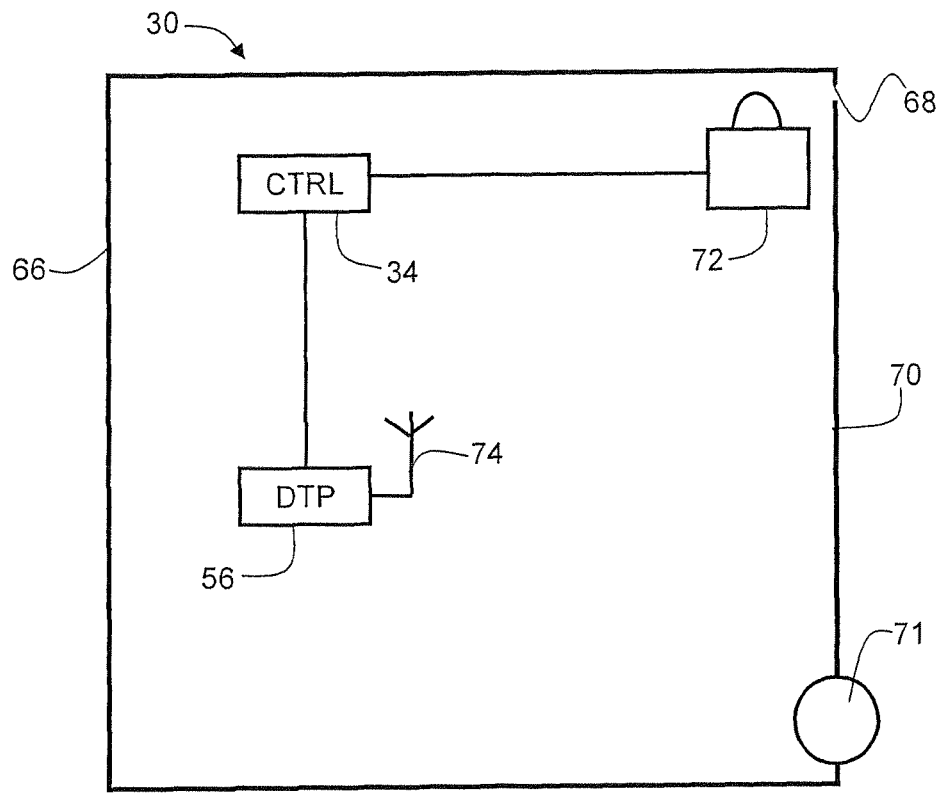
Figure 8D:
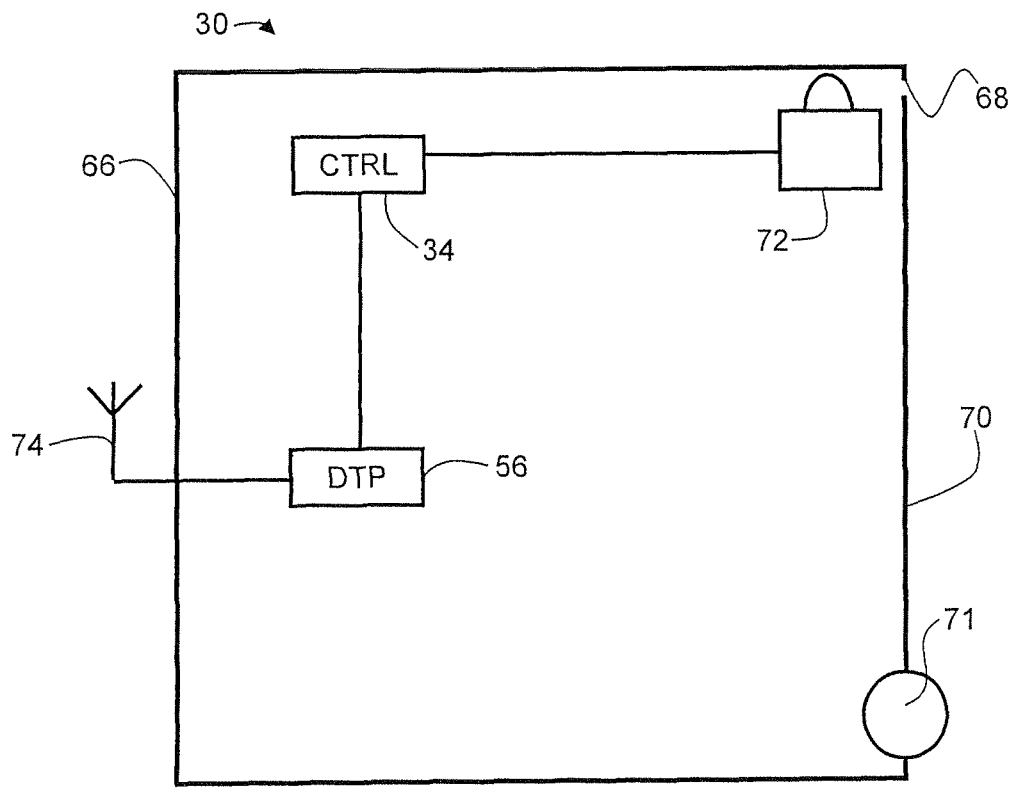
Figure 8E:
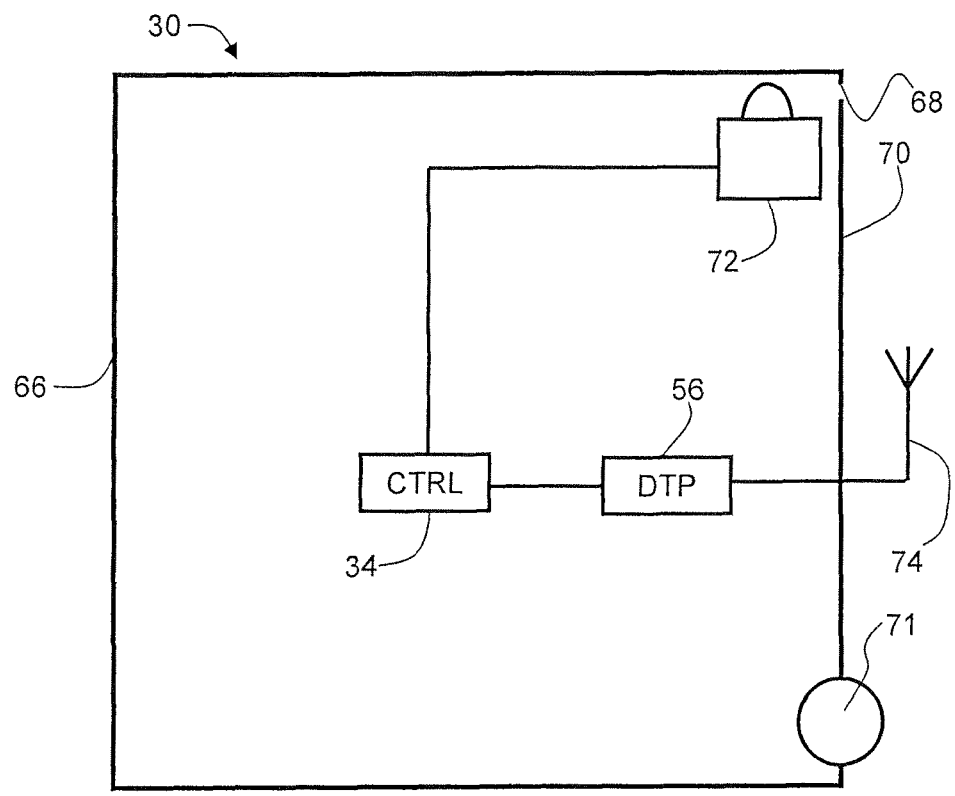

As best seen in FIG. 8C, antenna 74 may be located inside the confines of safe 30. In the embodiment of FIG. 5D, antenna 74 is shown passing through outer structure 66, which may allow a stronger transmission and reception signal from antenna 74, since antenna 74 is not completely shielded by safe 30. The embodiment of FIG. 8E is similar to the embodiment shown in FIG. 5D, except that antenna 74 passes through door 70 of safe 30. In either embodiment of FIG. 8D or 8E, antenna 74 passing through the outer surfaces of safe 30 does not necessarily have to be short, thereby keeping antenna 74 close to safe 30. In some embodiments, antenna 74 may have a long enough lead coupling it to data transfer port 56 that antenna 74 may be placed substantially clear and remotely from safe 30 so as to reduce the interference with reception and transmission by safe 30.

Figure 8F:
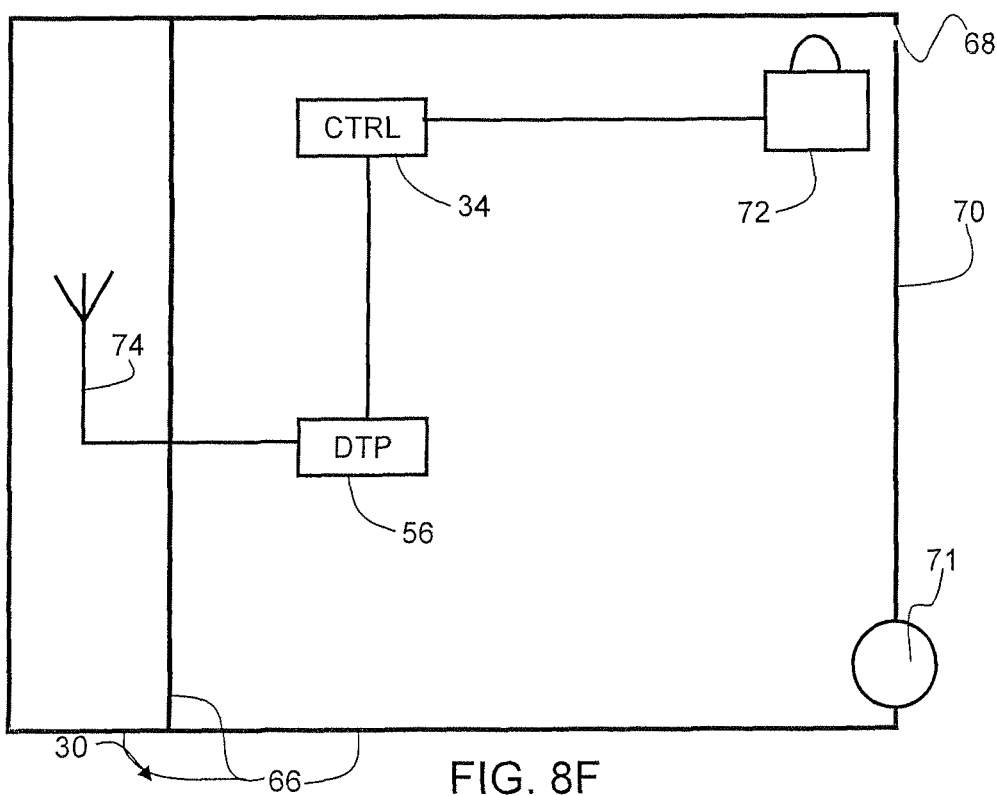
Figure 8G:
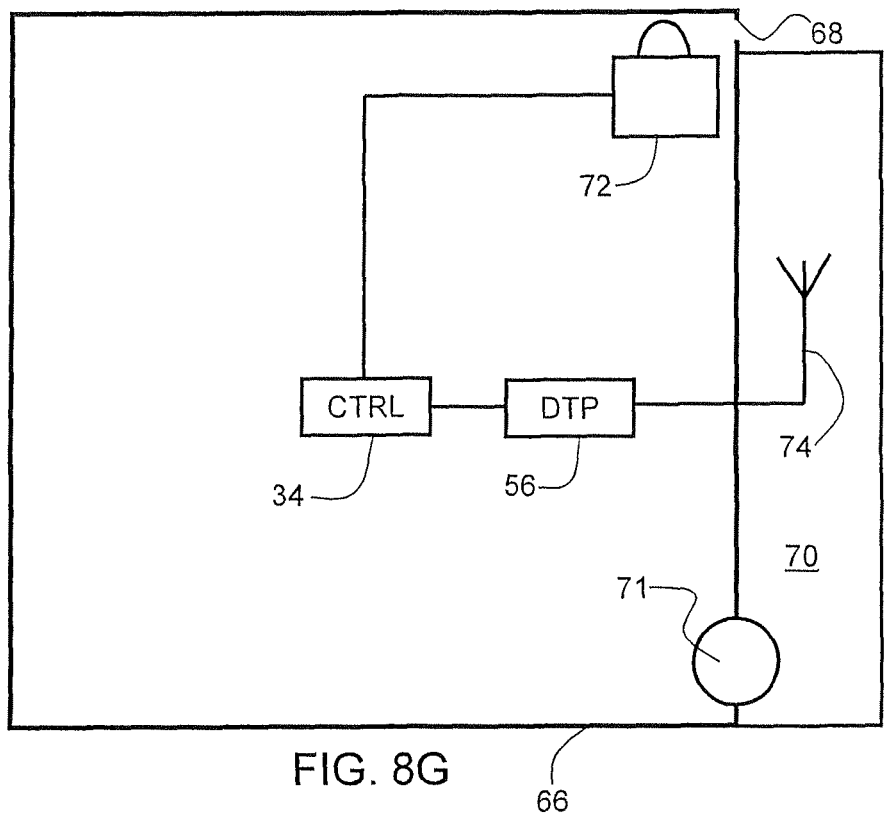

As best seen in FIG. 8F, antenna 74 is located inside outer structure 66. The embodiment of FIG. 8G is similar, but antenna 74 is located inside door 70 or an escutcheon plate mounted to door 70. Both of these embodiments may have the advantage that antenna 74 is concealed from view, thereby preventing a would-be thief from being able to tell the safe was electronically coupled to any external devices. Concealing antenna 74 may also prevent the antenna from being damaged.

Figure 8H:
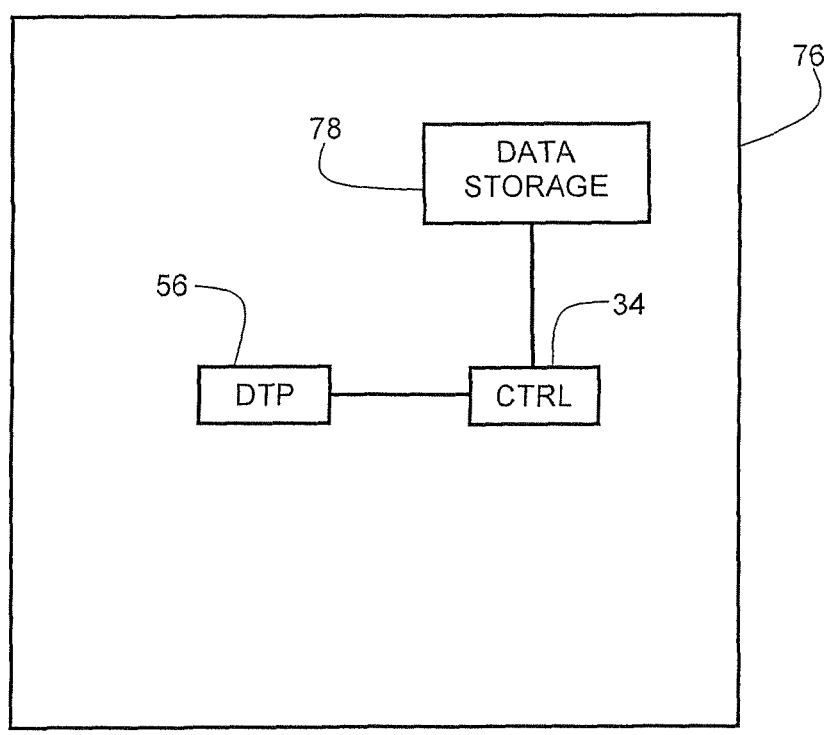

The embodiment schematically illustrated in FIG. 8H shows a safe made of an entirely closed box 76 with no access door. The closed box 76 could have been fabricated with a data storage device 78 inside. The closed box 76 safe could be operated from a data point of view exactly as safe 30 could be operated, but without the fear that someone could get inside the safe if the data transfer port 56 was somehow compromised.

FIGS. 8I-8M schematically illustrate embodiments of safe 30 structure and how it may relate to the previously mentioned elements wherein data transfer port 56 is not connected to safe controller 34 so that device data 36 may pass from an external computing device through data transfer port 56 to an internal device located within the safe 30 without interacting with safe controller 34 or using a valid code. For the embodiments of FIGS. 8I-8M, device data passes through data transfer port 56 using wireless communications. The use of the term wireless connection or wireless communication in these embodiments is defined as excluding infrared communications, and including radio frequency (RF) communications, 802.11, BLUETOOTH, CDMA cellular, and GSM cellular, and the like.

As best seen in FIGS. 8I-8M, safe 30 has an outer structure or housing 66 defining an access opening 68 which can be opened to allow access or closed to prevent access by a door 70 moveably or pivotally coupled to outer structure 66, for example, by one or more hinges 71. The schematic illustrations related to FIGS. 8I-8M show safe 30 in a top cross-sectional view. Safe 30 also has at least one lock mechanism 72 which may be selectively couple outer structure 66 and door 70. An example of a suitable lock mechanism 72 includes, but is not limited to, an electronic lock actuator. Lock mechanism 72 may be operatively coupled to safe controller 34 in some embodiments, but need not have to be coupled to the controller 34 at all, for example, in the case of a manual lock.

As best seen in FIGS. 8I-8M, data transfer port 56 may include an antenna 74. Using antenna 74 allows for a wireless connection between an external computing device and an internal device located within the safe 30, which can make backing up and/or accessing data more quickly than if infrared communications were used. Moreover, the use of wireless communication between the external device, data transfer port, and internal device located within the safe allows for more flexibility as to where the external computing device is located when wirelessly transferring device data since the external computing device sending device data to antenna 74 does not need to be in a direct line of sight as is the case with an infrared connection. This is a substantial benefit over the use of existing infrared communication systems that are used to transfer device data considering that many safes are often placed in out-of-the-way or hidden locations. Having an antenna 74 coupled to data transfer port 56 provides wireless connection with data transfer port 56 by an external computing device anywhere within the wireless range of antenna 74 and external computing device. Therefore, a user is not required to be in the immediate location of the safe when transferring device data to the internal device inside the safe. There is a wide range of flexibility provided to a user when using wireless communications to transfer device data to an internal device located within the safe as opposed to using infrared communications.

Figure 8I:
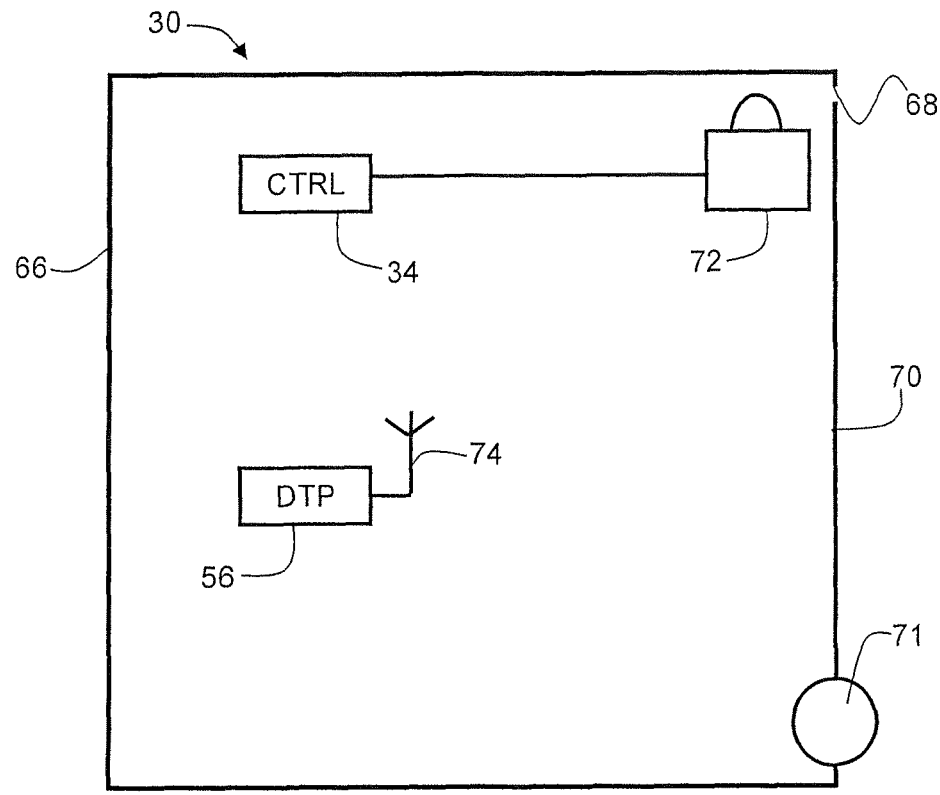
FIGS. 8I-8M schematically illustrate examples of safes with varying embodiments of data transfer ports that are not connected to the safe controller and having wireless connection capability.
Figure 8J:
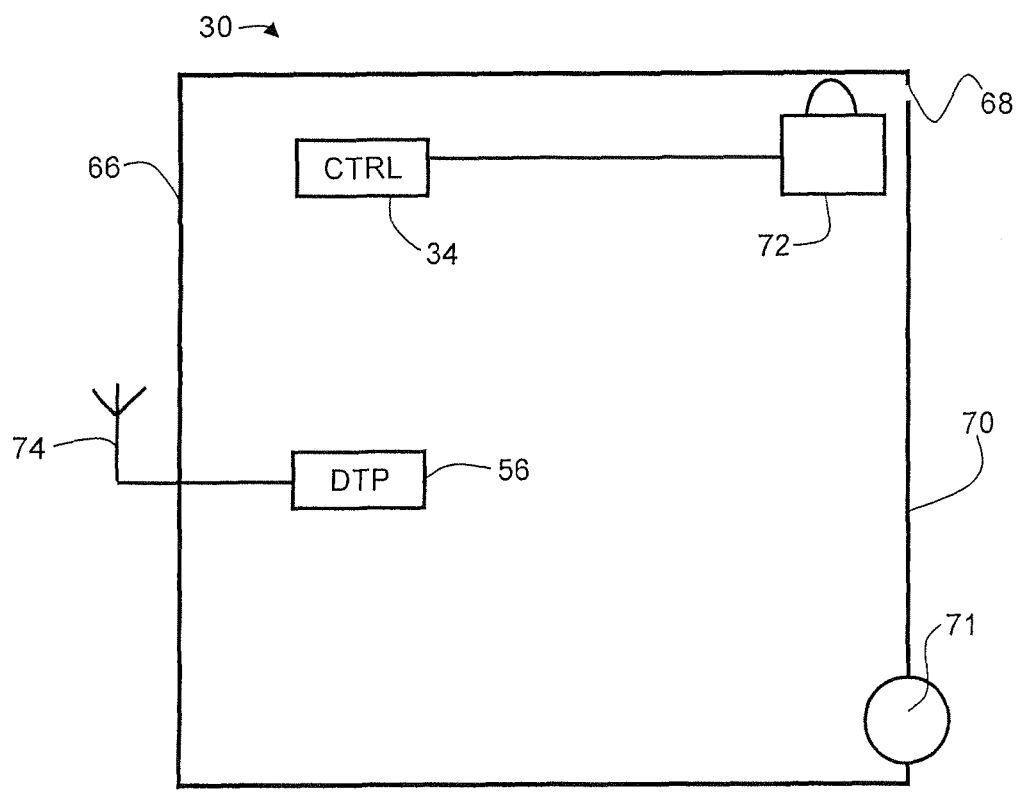
Figure 8K:
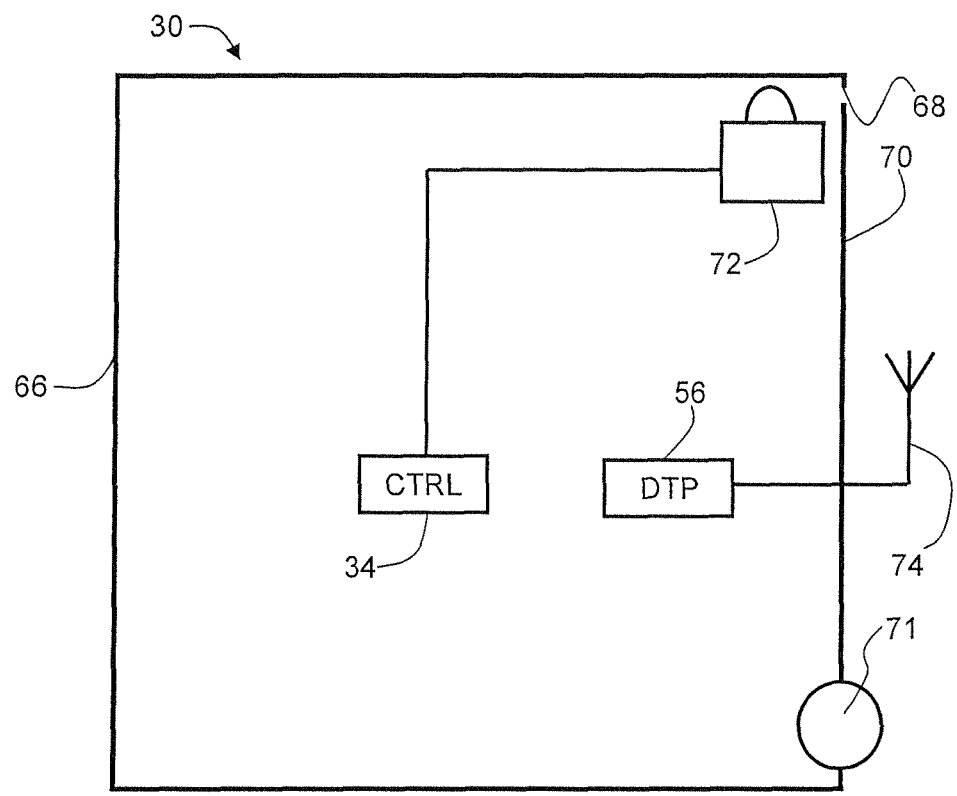

As best seen in FIG. 8I, antenna 74 may be located inside the confines of safe 30. In the embodiment of FIG. 8J, antenna 74 is shown passing through outer structure 66, which may allow a stronger transmission and reception signal from antenna 74, since antenna 74 is not completely shielded by safe 30. The embodiment of FIG. 8K is similar to the embodiment shown in FIG. 8J, except that antenna 74 passes through door 70 of safe 30. In either embodiment of FIG. 8J or 8K, antenna 74 passing through the outer surfaces of safe 30 does not necessarily have to be short, thereby keeping antenna 74 close to safe 30. In some embodiments, antenna 74 may have a long enough lead coupling it to data transfer port 56 that antenna 74 may be placed substantially clear and remotely from safe 30 so as to reduce the interference with reception and transmission by safe 30.

Figure 8L:
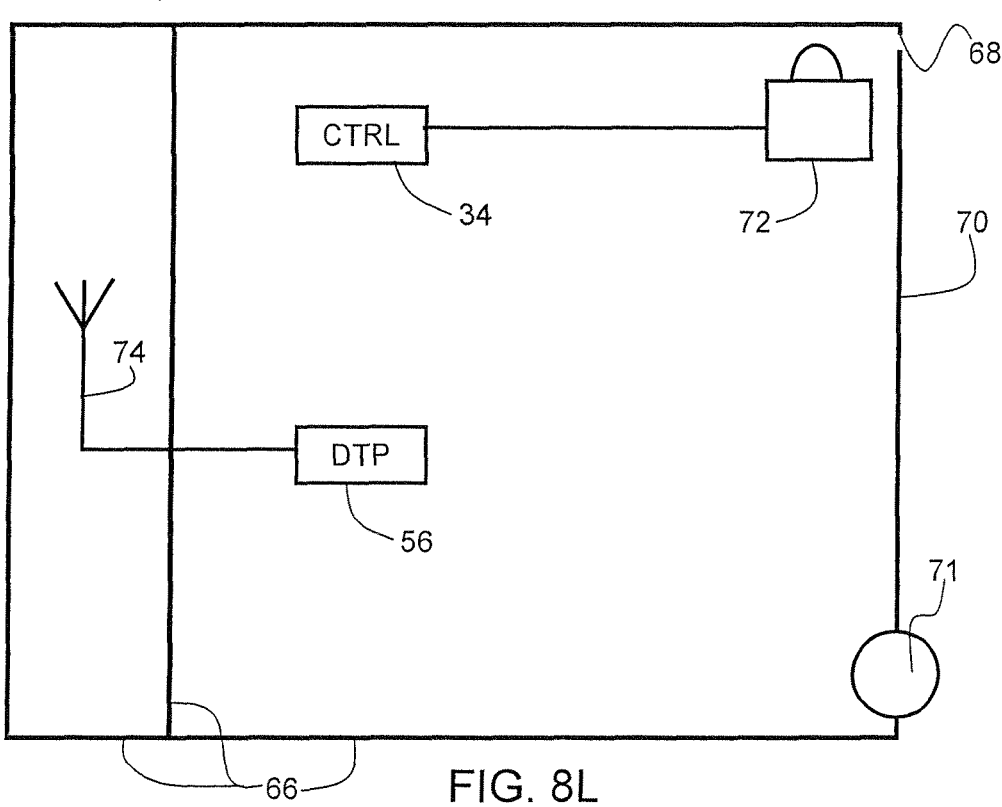
Figure 8M:
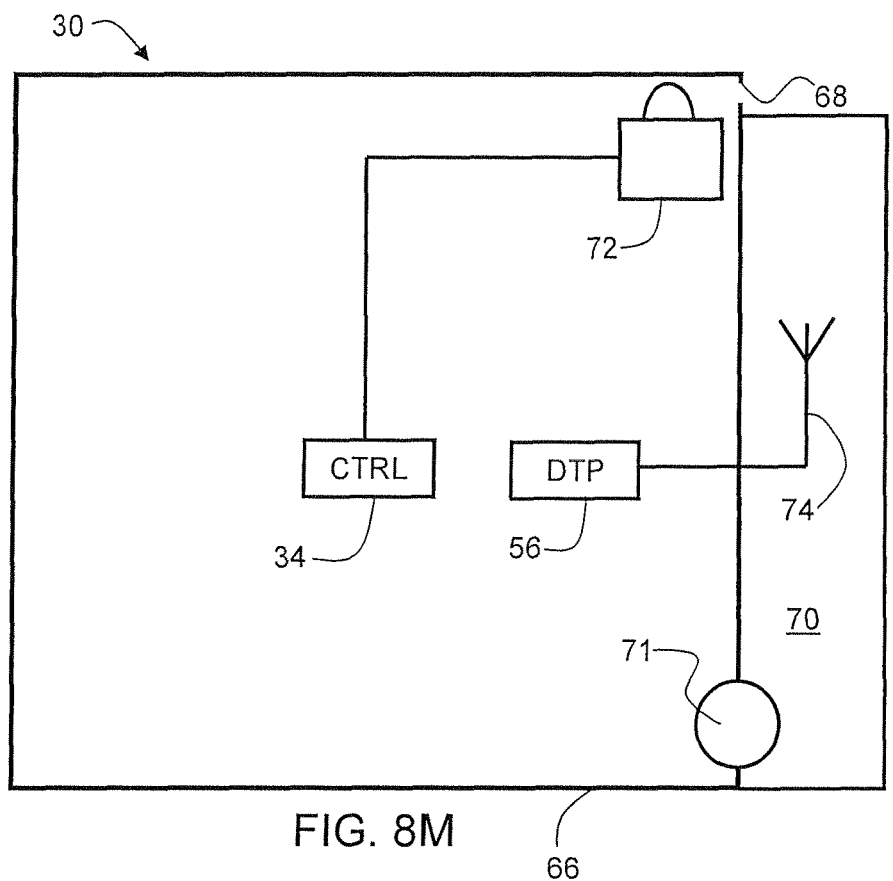

As best seen in FIG. 8L, antenna 74 is located inside outer structure 66. The embodiment of FIG. 8M is similar, but antenna 74 is located inside door 70 or an escutcheon plate mounted to door 70. Both of these embodiments may have the advantage that antenna 74 is concealed from view, thereby preventing a would-be thief from being able to tell the safe was electronically coupled to any external devices. Concealing antenna 74 may also prevent the antenna from being damaged.

Figure 9:
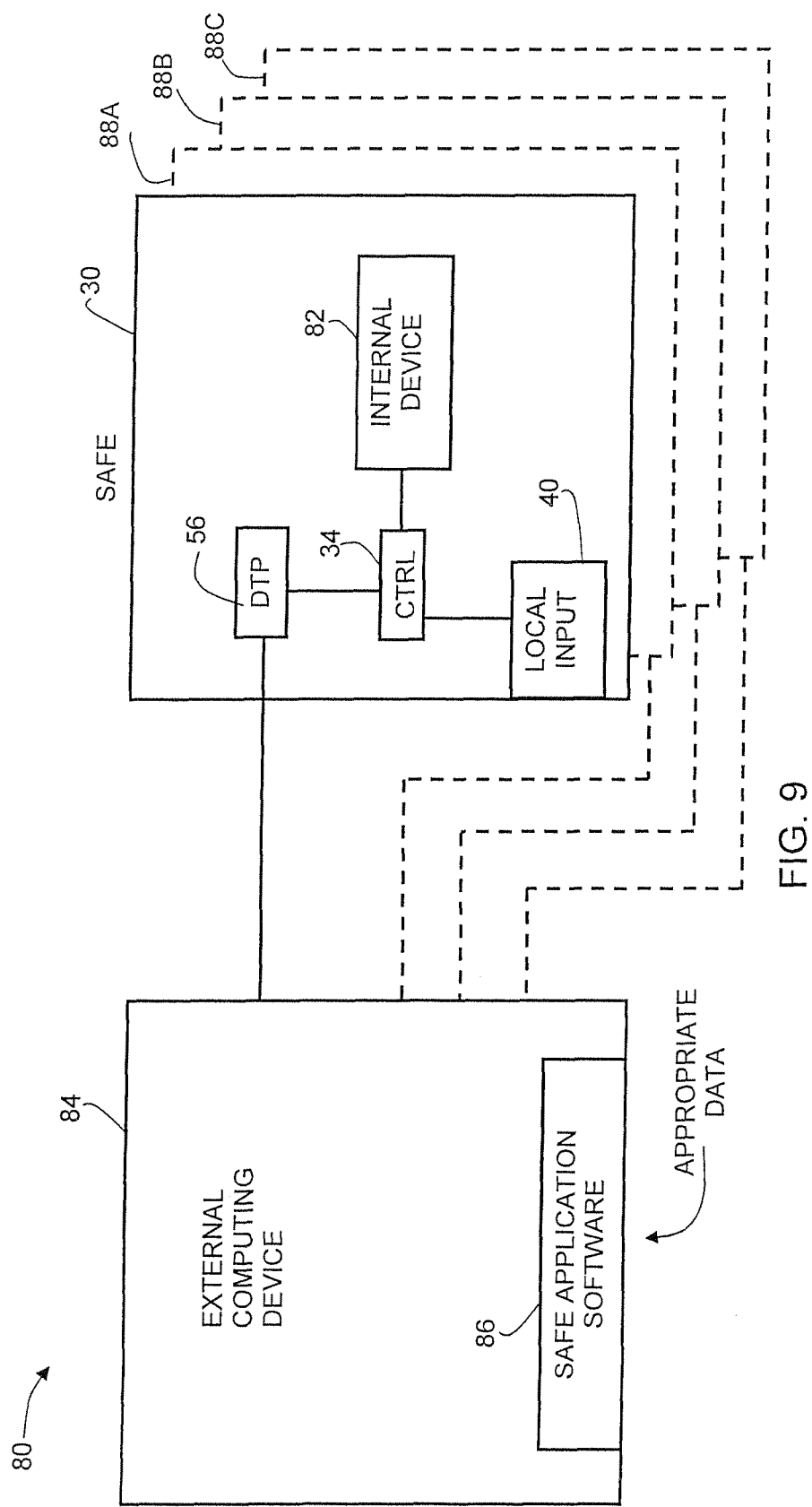
FIG. 9 schematically illustrates an embodiment of a system for controlling data communications between an external computing device and one or more internal devices in one or more safes.

FIG. 9 schematically illustrates an embodiment of a system 80 for controlling data communications with an internal device 82 in safe 30. Examples of suitable internal devices 82 include, but are not limited to an external hard drive, a zip drive, a CD/DVD writer, a flash memory, a memory reader, a digital camera, and an MP3 player.

Outside of safe 30, an external computing device 84 is coupled to the data transfer port 56 of safe 30. External computing device 84 is configured to run a series of instructions stored on a computer readable medium, the series of stored instructions at least in part making up a safe application software 86. Safe application software 86 enables the external computing device to format the device data appropriate to internal device 82 being accessed within safe 30 with the appropriate communications data (including a valid code) such that safe controller 34 will allow external computing device 84 to communicate with internal device 82. Safe application software 86 may also be configured to allow the external computing device 84 to be connected to more than one safe, such as safes 88A, 88B, and 88C, and access various internal devices stored within a plurality of safes. In some embodiments, safe application software 86 may also have the capability of controlling various parameters pertaining to safe 30.

Various scenarios regarding unlocking safe 30 can be implemented using safe application software 86, which can pass access control data over data transfer port 56 to safe controller 34 where it may be stored in the nonvolatile memory of safe controller 34 in some embodiments. One such scenario is to have separate valid codes for various individuals using safe 30, as will be described in more detail below with reference to FIG. 10, so that, for example, a log can be made of each entry into safe 30 and/or each data transaction with a device in safe 30 by each user. Also, if a person is no longer authorized to open safe 30, that person's valid code can be removed from safe controller 34 without affecting the other codes. Other scenarios include disabling the ability to unlock safe 30 by a user using a key lock, a keypad, a remote control sensor, an electronic key reader, a biometric input device, or an electronic card reader, and/or a computer 84 or some combination of these options. Thus, in one example scenario, an administrator of safe application software 86 can prevent anyone besides the administrator from opening safe 30 by disabling any local input devices 40 on safe 30. Alternatively, the administrator can disable some of local input devices 40 on safe 30 leaving; for example, only a keypad enabled, and then set only one valid code for the keypad to allow the administrator exclusive access to safe 30 when safe 30 is not connected to computer 84. The administrator can then open safe 30 either from computer 84 or by entering the valid code into the keypad. In another scenario, an administrator can configure safe application software 86 to send appropriate commands to safe controller 34 to allow the administrator to add a user code using the keypad by first entering an administrative password, entering a code to tell safe controller 34 that the next code is a new user code, and then entering the new user code. In a similar manner, a user code could be disabled. The changes entered through the keypad are sent to safe application software 86 by safe controller 34 either as they occur or at a later date.

Figure 10:
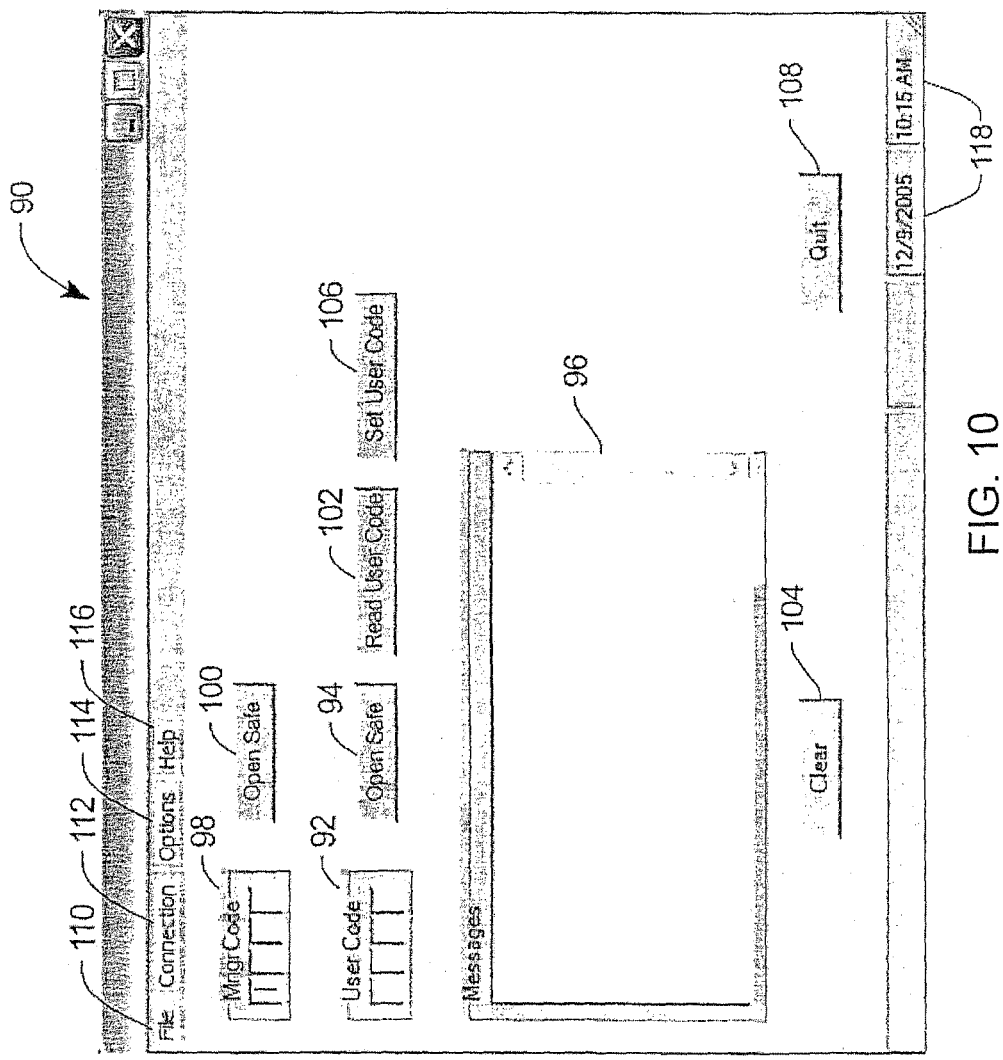
FIG. 10 illustrates one embodiment of a view of a computer screen generated by application software on the external computing device of FIG. 9.

FIG. 10 is a view of a computer screen 90 generated by safe application software 86 which is both a user unlock screen and an administrator user code control screen. During normal operation, a user can enter his or her code in the "USER Code" box 92, and click an "Open Safe" button 94 to open safe 30. The "Open Safe" button 94 could mean that safe 30 will physically be unlocked, that the data transfer port will be unlocked, or both, depending on the embodiment. Other embodiments of safe application software 86 may have explicit buttons for all three choices. A "Messages" box 96 may be programmed to provide the user with information such as the confirmation that safe 30 has been unlocked or that an invalid code has been entered.

In this embodiment, an administrator using screen 90 would first enter his or her manager code in a "Mngr Code" box 98. The administrator can then open safe 30 by clicking an "Open Safe" button 100, enter a user code in "User Code" box 92 and click the "Read User Code" button 102 to have the transaction history of the person with this code displayed in "Messages" box 96. The administrator may also click a "Clear" button 104 to remove the user code in "USER Code" box 92 from the list of valid codes thereby prohibiting the user with this code from having access to safe 30. The administrator can also set up a new user code by entering the new code in "User Code" box 92 and clicking a "Set User Code" button 106. Either the user or the administrator can leave screen 90 by clicking a "Quit" button 108. Near the top of screen 90 is a "File" button 110 for selecting other screens of safe application software 86 or for exiting the safe application software 86, a "Connection" button 112 allows the user or administrator to select which one of safes 30, 88A, 88B, 88C, etc (in the case where there is more than one safe coupled to the external computing device 84) with which to communicate. A selection of various parameters available for the selected safe can be seen with an "Options" button 114. Several options may include selecting what type of data is to be displayed in "Messages" box 96, and a "Help" button 116 for receiving information on the use of screen 90. At the bottom of screen 90 are two displays 118 showing the present time and date.

Safe application software 86, in addition to the functions described above with reference to FIG. 10 has, as previously stated, many more capabilities with respect to safe 30. These may include, but are not necessarily limited to, instructing safe controller 34 to log, and possibly later transmit to external computing device 84, all input data to safe controller 34 from local input device 40, such as from a password entry module; a sensor module; and even a camera which may be coupled to the safe controller 34.

Safe controller 34 may be instructed to keep track of the number of unsuccessful attempts to enter safe 30 using a keypad, and the keypad may be disabled temporarily after a certain number of unsuccessful attempts within a predetermined time period. Such data may alert a supervisor to a security threat or may indicate which user has forgotten part of his or her code.

As discussed earlier, the data passing between external computing device 84 and data transfer port 56 of safe 30 may be coupled with many different types of connections, both electrical, wireless, and optical, using a variety of protocols. Further, the data may be, for example, packetized, encoded, or encrypted with either a proprietary or published encryption method.

Figure 11:
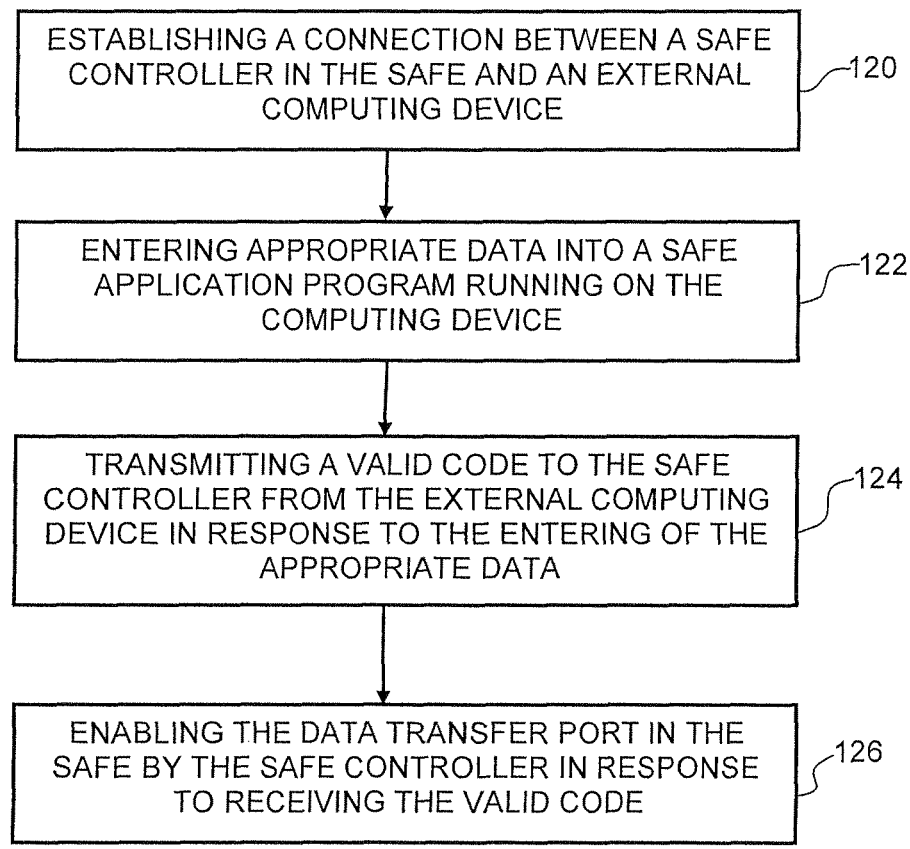
FIG. 11 illustrates an embodiment of a method for unlocking a data transfer port in a safe.

FIG. 11 illustrates a method for unlocking a data transfer port in a safe. In accordance with the method, a connection is established between a safe controller in the safe and an external computing device at step 120. At step 122, appropriate data is entered into a safe application program running on the computing device. A valid code is transmitted to the safe controller from the external computing device in response to the entering of the appropriate data at step 124. The data transfer port in safe 30 is enabled 126 by the safe controller in response to receiving the valid code at step 126.

Figure 12:
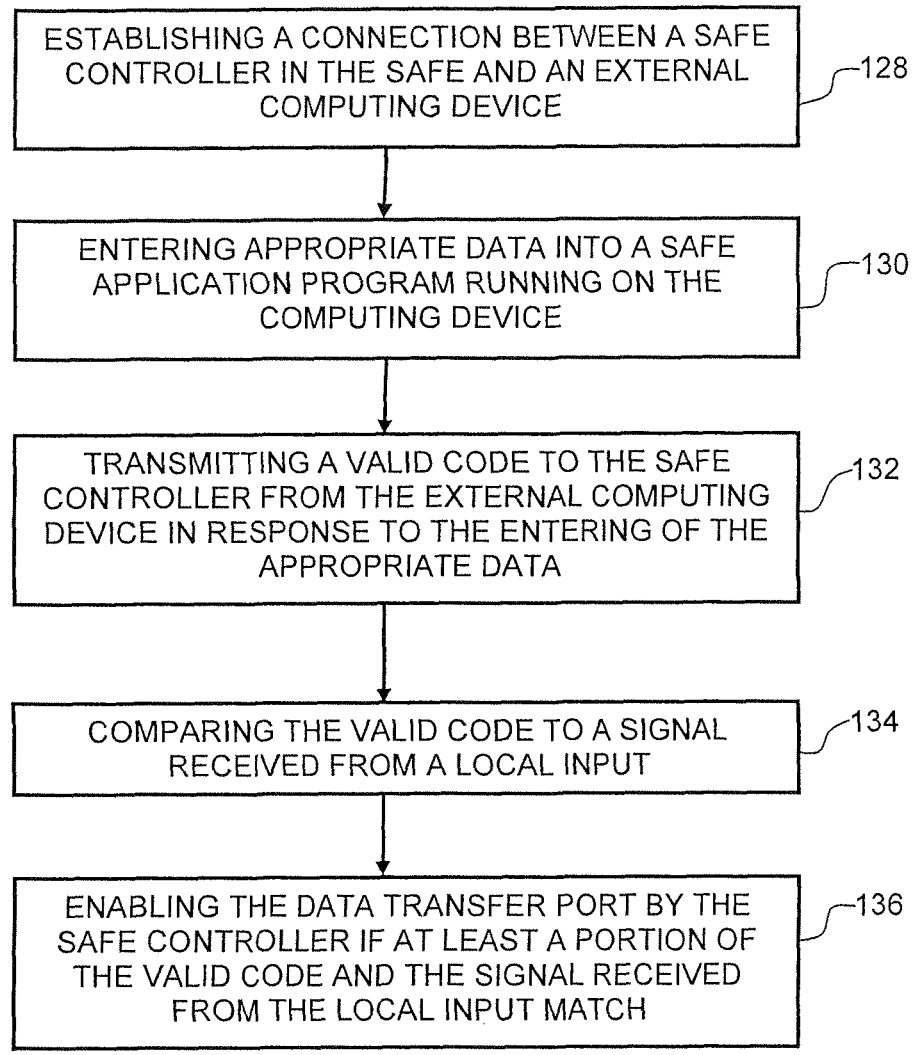
FIG. 12 illustrates another embodiment of a method for unlocking a data transfer port in a safe.

FIG. 12 illustrates another method for unlocking a data transfer port in a safe. In this method, a connection is established between a safe controller in the safe and an external computing device at step 128. At step 130, appropriate data is entered into a safe application program running on the external computing device. A valid code is transmitted to the safe controller from the external computing device in response to the entering of the appropriate data at step 132. The valid code is compared to a signal received from a local input device at step 134. At step 136, the data transfer port is enabled by the safe controller if at least a portion of the valid code and the signal received from the local input device match.

Figure 13:
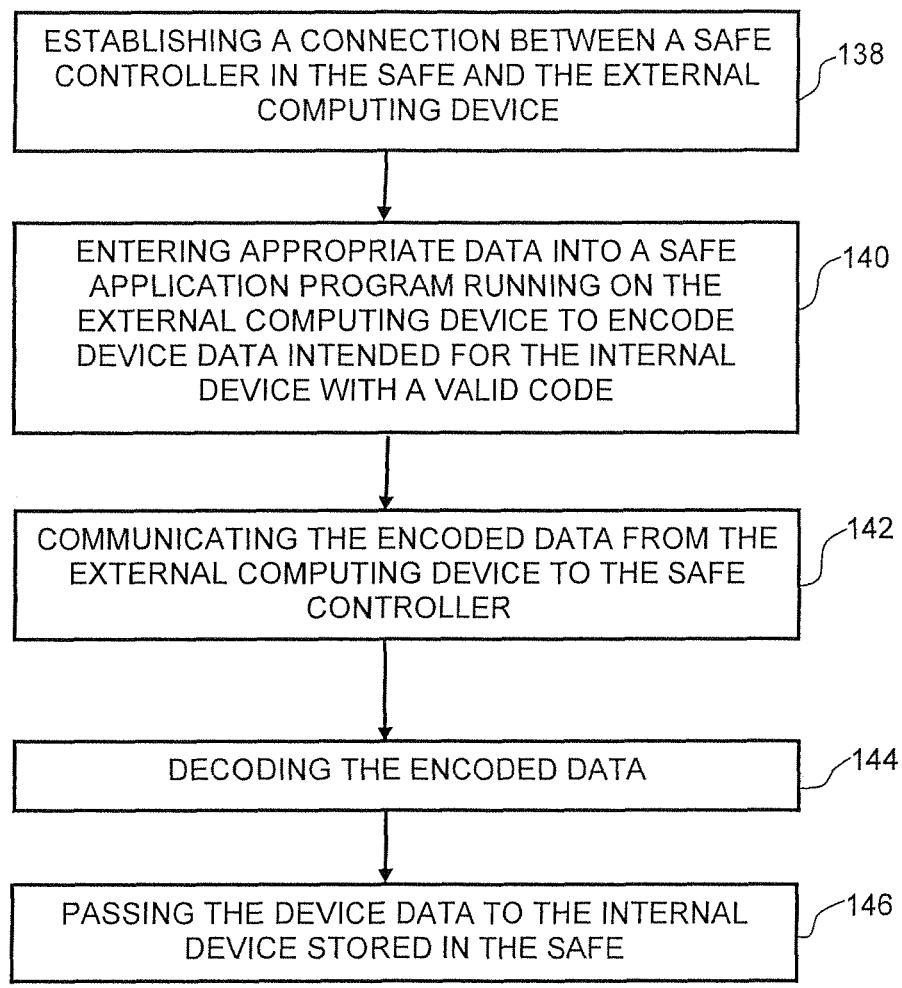
FIG. 13 illustrates an embodiment of a method for passing data between an external computing device and an internal device inside a safe.

FIG. 13 illustrates a method for passing data between an external computing device and an internal device inside a safe. In this method, a connection is established between a safe controller in the safe and the external computing device at step 138. At step 140, appropriate data is entered into a safe application program running on the external computing device to encode device data intended for the internal device with a valid code. As discussed above, an encoded valid code can be sequential with the device data or packetized with the device data. At step 142, the encoded data is communicated from the external computing device to the safe controller. At step 144, the safe controller decodes the encoded data. The device data is passed to the internal device stored in the safe at step 146.

Figure 14:
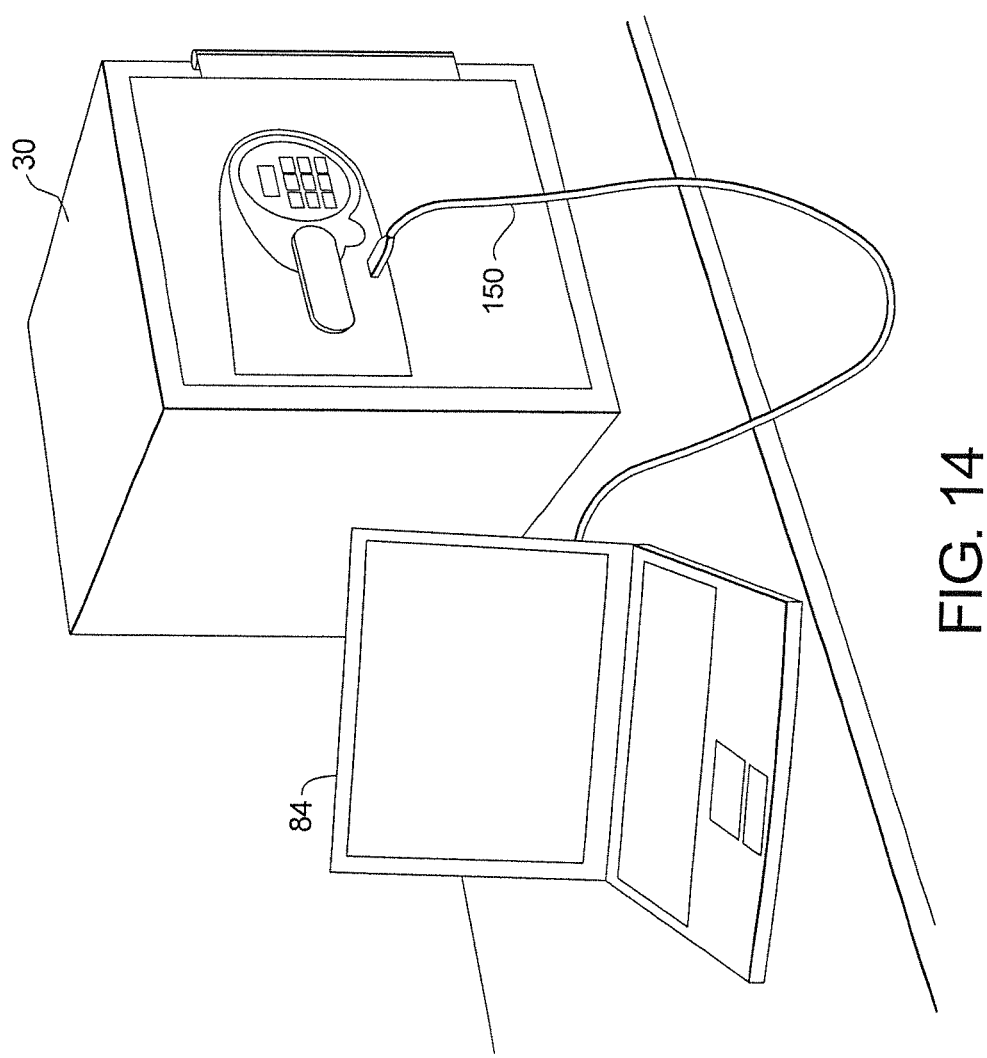
FIG. 14 is a perspective illustration of an embodiment of the system of FIG. 9.

FIG. 14 is a perspective view of another embodiment of safe 30 and an external computing device 84, illustrated as a laptop computer in this embodiment. In this embodiment, external computing device 84 is using a USB connection 150 to couple to the safe controller via the data transfer port. In other embodiments, other types of ports and connectors may be used, as have been described above.

Figure 15:
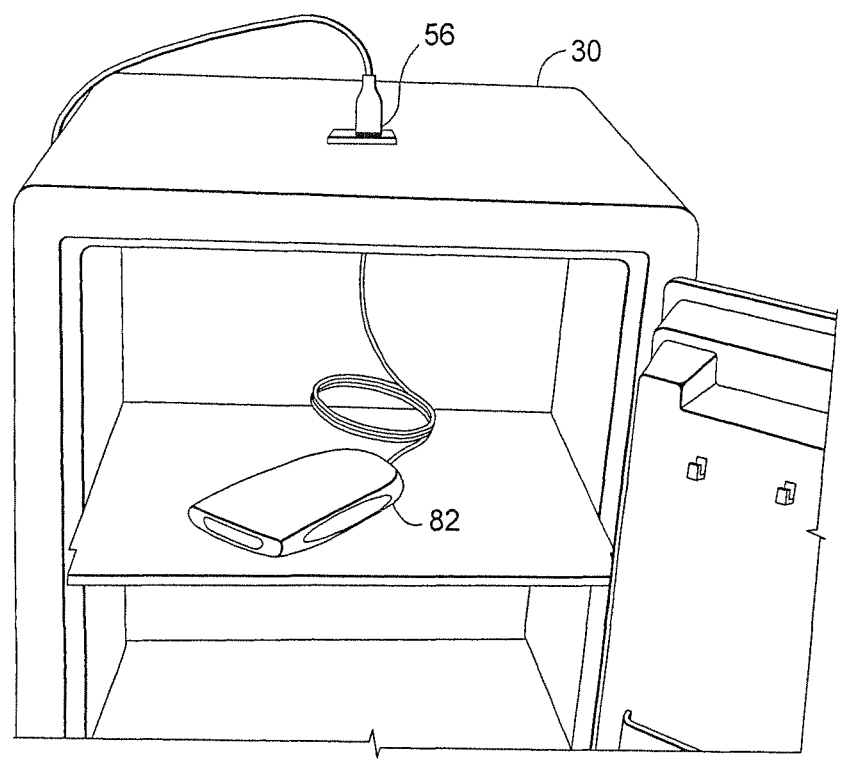
FIG. 15 is a perspective illustration of one embodiment of a safe having a data transfer port through the outer structure of the safe.

FIG. 15 is a perspective view of the inside of another embodiment of safe 30 with data transfer port 56 mounted or positioned in the top of safe 30. An internal device 82, herein illustrated as a hard drive, is located within safe 30.

The data transfer port may be configured in some embodiments to act like a hub whereby multiple interior devices may be connected to it. If the data transfer port is not inherently designed to act like a hub, a hub may be coupled to the data transfer port or the safe controller, depending on where the device data is flowing through the safe. Regardless of whether or not the hub functionality comes from safe controller 34 or a hub coupled to the safe controller, the availability of the hub ports may be controlled by safe controller 34 in some embodiments. Since safe controller 34 may be controlled in turn by safe application program 86 running on external computing device 84, the availability of the hub ports may also be controlled by safe application program 86. Safe application program 86 may be configured to allow individuals to store and have access to data on their port, but not have access to the other ports on the hub.

Figure 16:
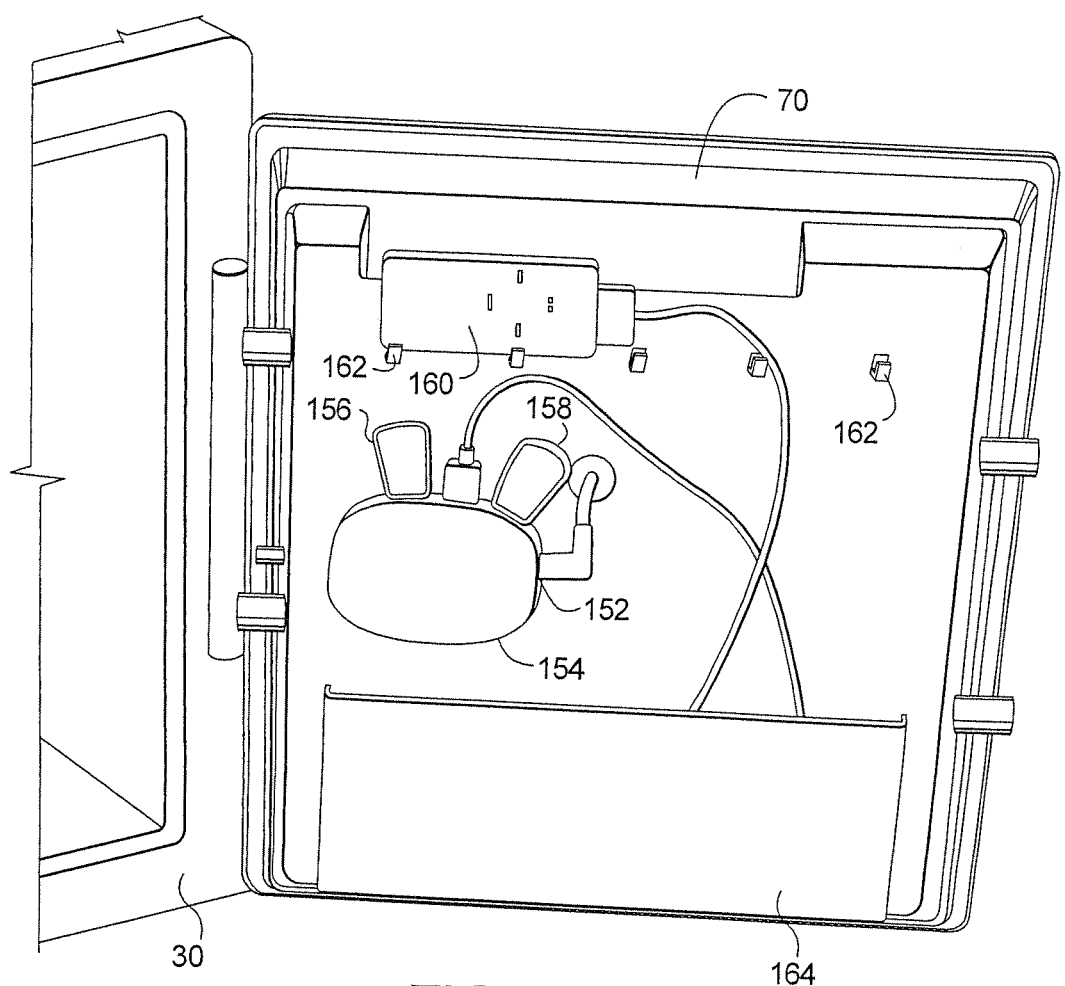
FIG. 16 illustrates a perspective view of an embodiment of the inside of the safe's door, illustrating examples of various internal devices.

FIG. 16 illustrates a perspective view of a portion of the inside of safe 30. The data transfer port is located within door 70, and the internal side of the data transfer port is coupled by connector 152 to a hub 154 which is mounted on the inside of door 70. Hub 154 allows various internal devices to be selectively accessible through the data transfer port by an external computing device (not shown in this view). For example, two different flash memory devices 156 and 158 are coupled to hub 154. Additionally, an MP3 player 160 is coupled to hub 154. Some embodiments of safes, such as this one may have hooks 162 for holding various internal devices or providing convenience in routing the cables which connect devices. Similarly, some embodiments of safes may be provided with one or more flexible or rigid pockets 164 for storing and organizing internal devices and any cables necessary for such items.

Figure 17:
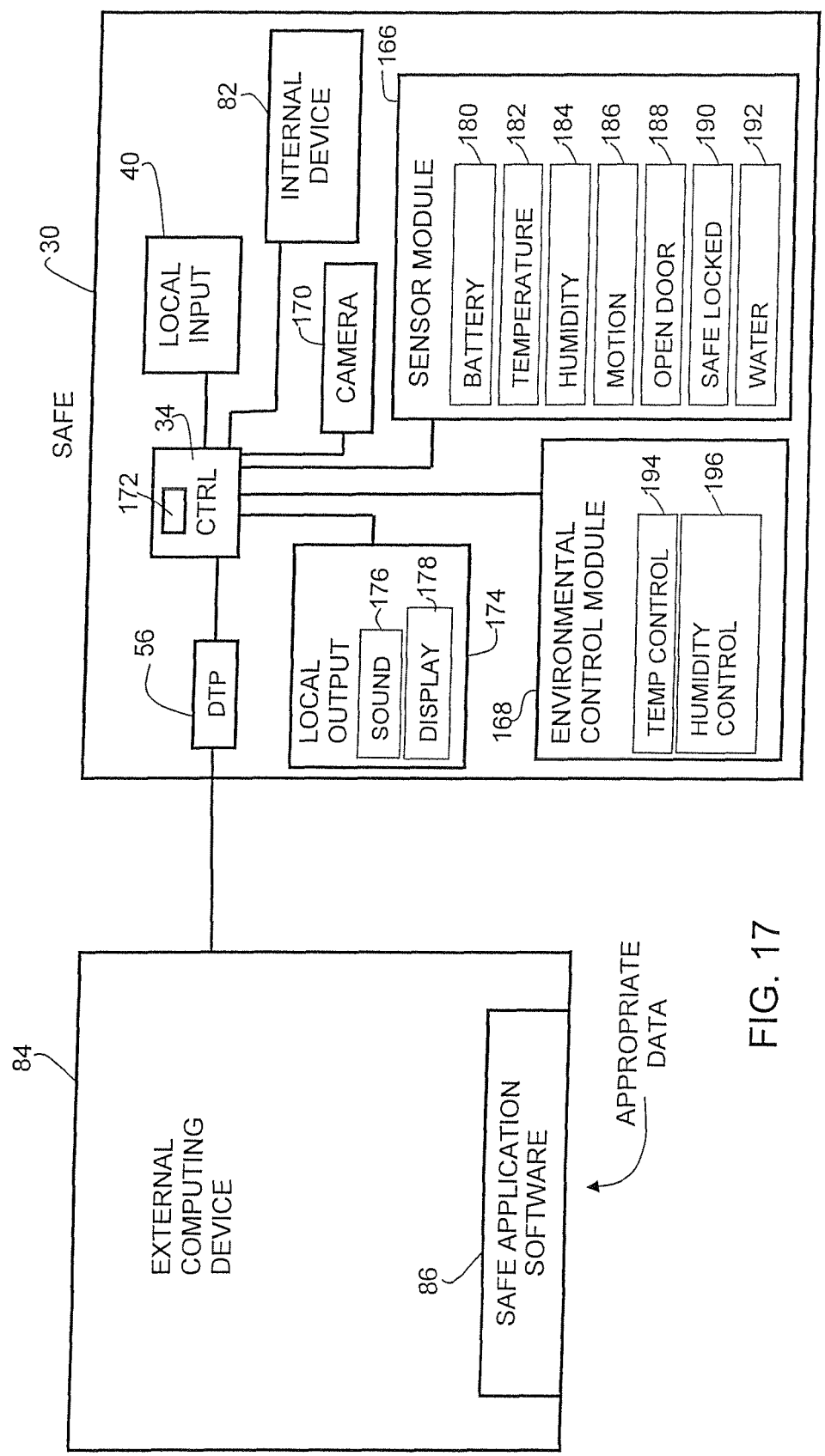
FIG. 17 schematically illustrates an embodiment of a safe having a sensor module and an environmental control module.

The safe embodiments discussed thus far allow easy transfer of data to and from an internal device located within the safe, thereby obviating the need to open the safe, connect to the internal device, and relock the safe. Other embodiments of safes may include further capabilities which may be configured to take advantage of the safe's data transfer capabilities. For example, safe 30 in the embodiment schematically illustrated in FIG. 17 includes a sensor module 166, an environmental control module 168, and a camera 170 which may be coupled to safe controller 34. The embodiment of FIG. 17 also has a real time clock 172 and a local output 174 coupled to controller 54. Although the embodiment of FIG. 17 includes sensor module 166, environmental control module 168, camera 170, real time clock 172, and local output 174, it should be understood that other embodiments may have none, only one, or any sub-combination of these features.

Local output 174 may include a sound producing device 176 such as a speaker, buzzer, and/or a siren. Local output 174 may also or alternatively include a display 178 located on safe 30 for aiding a user while operating safe 30.

Sensor module 166 may include, but is not limited to, a battery charge level sensor 180, a temperature sensor 182, a humidity sensor 184, a motion sensor 186 (such as an accelerometer), an open door sensor 188, a sensor 190 to sense if the safe is locked, and a water/moisture sensor 192 to sense if water has seeped into the safe 30. The safe controller 34 can set threshold limits for the battery charge level, temperature, humidity, motion, and water/moisture sensors 180, 182, 184, 186, and 192, respectively, and alert safe application software 86 when a threshold or an out of limit condition has been crossed. Alternatively, safe application software 86 can instruct safe controller 34 to read any combination of sensors 180-192 and transfer the readings to safe application software 86.

The motion sensor 180 may be used to detect if safe 30 is being stolen, and if detected, an audible and or visible alarm can be initiated with the appropriate local output 174. Other embodiments may initiate an alarm condition via the communication connection with external computing device 84. Safe application software 86 may be configured to send an email, page, fax, text message, and/or instant message upon the receipt of an alarm condition. The safe application software may also be configured to call a desired telephone number (landline or mobile) to leave an automated message related to the alert. In other embodiments, safe 30 may be configured to connect via landline, cellular link, or some other wired or wireless connection to alert one or more persons that an alert condition is present. Additionally, in embodiments where safe 30 may be left connected to the external computing device 84, safe application software 86 may set up a communication check sequence with safe controller 34 to detect if the data connection is severed by the movement of safe 30.

Environmental control module 168 may include a temperature control device 194 and a humidity control device 196 for controlling the temperature and humidity, respectively, inside safe 30, Temperature control device 194 and humidity control device 196 are controlled by safe controller 34, which in turn, may be controlled by safe application program 86 on external computing device 84.

Camera 170 can be configured to capture still photos and/or video. Camera 170 can be directed inside safe 30 to capture entry into safe 30, to identify persons accessing safe 30, and to identify objects and/or documents put into or taken out of safe 30. The camera images can be transmitted in real time to external computing device 84 or stored in a memory coupled to safe controller 34 for later transmittal to the external computing device for remote viewing and/or saved for local viewing on display 178 which can be a part of safe 30 in some embodiments.

Camera 170 may also be directed outside safe 30 and have a connection through the wall of safe 30 to safe controller 34 for better identification of a person accessing or attempting to access safe 30. In some embodiments, safe controller 34 may be configured to recognize an interrupt between camera 170 and safe 30, and then disable entry into safe 30, sound an alarm, and/or make a cell phone or other wireless connection. Camera 170 can also be directed to photograph a panoramic view of the room or area that safe 30 is located in to capture activity that takes place in the room or area.

Real time clock 172 may be coupled to safe controller 34 (internal or external to the safe) for various purposes, including setting safe controller 34 to perform predetermined functions at the same time each day, such as enabling and disabling access to safe 30.

Figure 18:
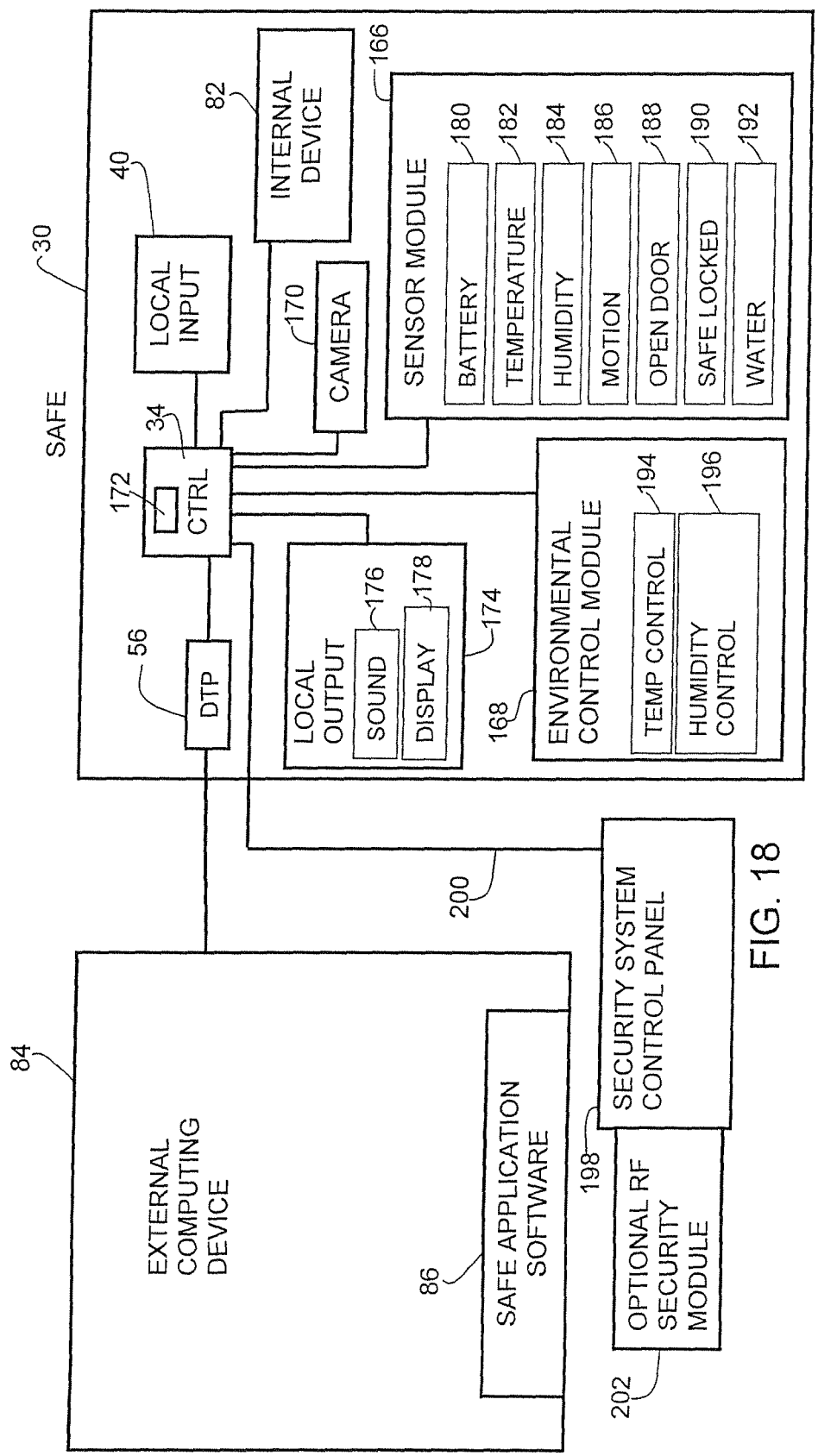
FIG. 18 schematically illustrates an embodiment of a safe coupled to a security system control panel.

FIG. 18 schematically illustrates an embodiment of safe 30 where safe controller 34 is coupled to a home or other type of security system control panel 198. The coupling 200 between safe controller 34 and security system control panel 198 can be direct, via the data transfer port, or via a separate communication port. Coupling 200 may be made with one or more wires, optical connections, and/or RF connections. In the case of an RF connection, security system control panel 198 may be equipped with an optional RF security module 202. Alternatively, the RF module may be an integral part of the security system control panel 198. This connection to security system control panel 198 is in addition to the data connection to external computing device 84. This arrangement allows safe 30 to take advantage of the monitoring and notification capabilities of the security system. In one example, if the safe is broken into, a corresponding signal could be sent from safe 30 to security system control panel 198, an alarm on the premises could be sounded by security system control panel 198, the alarm signal could be relayed to a security monitoring station, and the police and/or owner of the safe could be alerted by one or more of a wireless connection inside the safe, by security system control panel 198, or by the security monitoring station. External computing device 84, if it is either wired or wirelessly connected to safe 30, could also send a signal to the security monitoring station, police, and/or owner. The security monitoring station, police, and/or owner may be alerted by cell phone, text message, email, or any other type of communication system.

Figure 19:
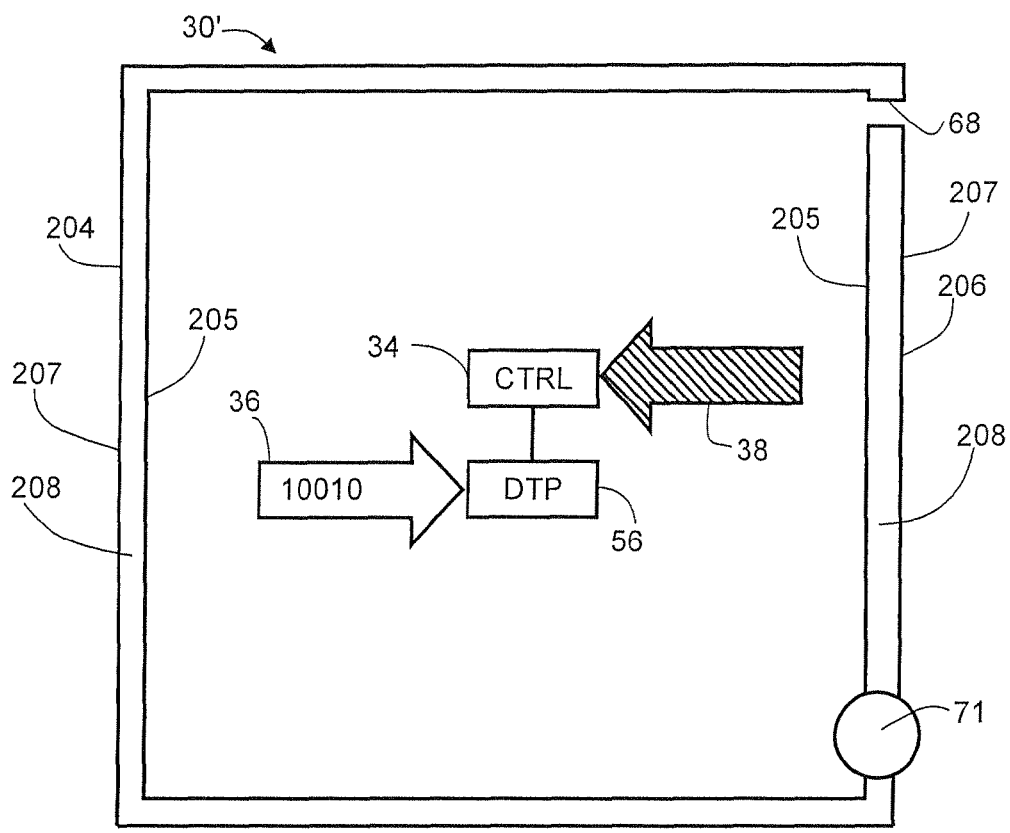
FIG. 19 schematically illustrates an embodiment of a safe having a double-walled construction.

While reference has been made to various embodiments, it should be understood that numerous changes may be made within the spirit and scope of the inventive concepts described. As just one example, although many of the safes schematically illustrated herein have been shown with a single wall, other embodiments of safes can have multiple walls, such as the safe disclosed in Sentry's U.S. Pat. No. 6,269,966. FIG. 19 schematically illustrates a safe 30' having a double-walled outer structure or housing 204 and a double-walled door or lid 206. Both outer structure 204 and door 206 may have inner 205 and outer walls 207 that define an insulation space therebetween, which may be filled with an insulating material, such as fire-resistant insulating material 208. The fire-resistant material that may be used in safe 30' may include, but is not limited to, one or more of an insulative mineral wool, a sodium silicate intumescent material, and insulation that is described in Sentry's U.S. Pat. No. 4,645,613. Safe 30' may have a data transfer port 56 and a safe controller 34 coupled to data transfer port 56, wherein safe controller 34 is configured to selectively enable device data 36 to pass through data transfer port 56 when valid code 38 is received by safe controller 34.

Figure 20:
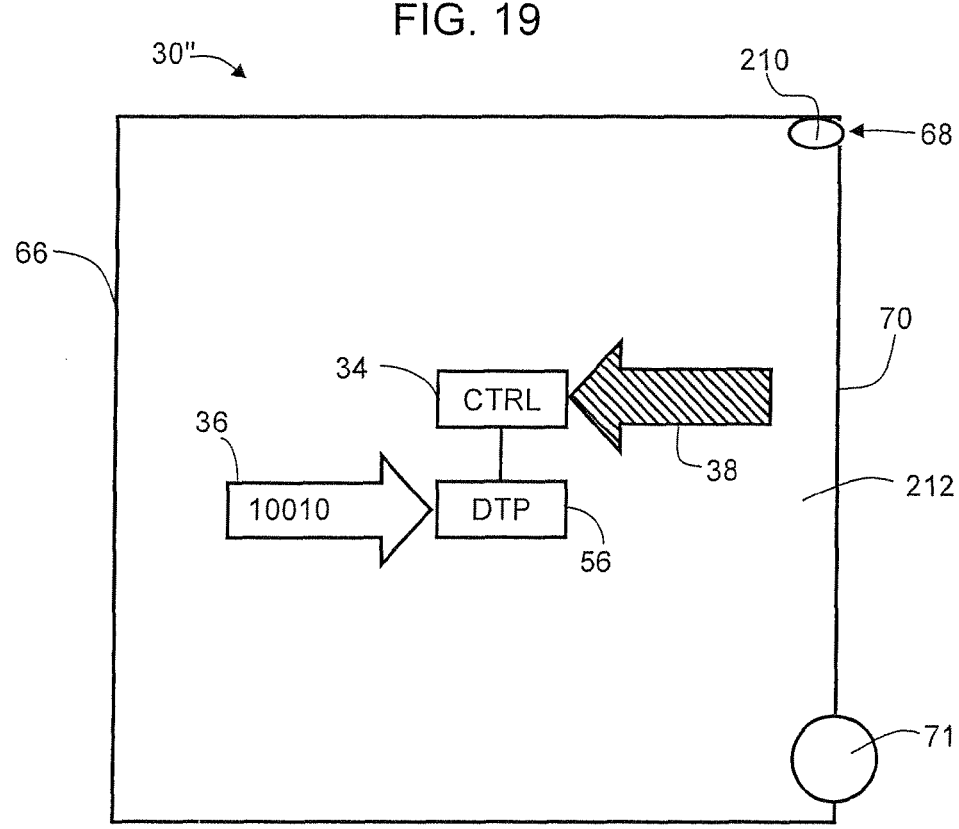
FIG. 20 schematically illustrates an embodiment of a safe that is water-resistant.

As just one other example that numerous changes may be made within the spirit and scope of the inventive concepts described herein, in embodiments where safe 30 is a water-resistant safe 30". Safe 30" may have features such as those shown in Sentry's U.S. Pat. No. 6,752,092. FIG. 20 schematically illustrates safe 30" having a gasket 210 positioned at the interface between outer structure or housing 66 and door or lid 70. Gasket 210 may be coupled to at least one of outer structure 66 or door 70, and is configured to entirely or substantially preventing water from entering an interior compartment 212 of safe 30" when door 70 is closed and locked in place relative to outer structure 66. Safe 30" may have data transfer port 56 and safe controller 34 coupled to data transfer port 56, wherein safe controller 34 is configured to selectively enable device data 36 to pass through data transfer port 56 when valid code 38 is received by safe controller 34.

Accordingly, it is intended that the invention not be limited to the described embodiments, but will have full scope defined by the language of the following claims and their equivalents.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. §112.

What is claimed is:

1. A safe comprising:
   an outer structure defining an access opening and an interior compartment;
   a door pivotally coupled to the outer structure and configured for being moved between an opened position and a closed position, wherein the door is positioned in the access opening when in the closed position;
   a data transfer port comprising an external side, an internal side and a communication port, wherein the external side is accessible from outside the safe, wherein the data transfer port is configured to be in communication with a data storage device positioned within the interior compartment of the safe, wherein the data transfer port is configured to receive a valid code and device data, and wherein the valid code and the device data are encoded together as coded data; and
   a safe controller coupled to the internal side of the data transfer port, wherein the safe controller comprises an internal data port accessible from the interior compartment of the safe, and wherein the safe controller is configured to recognize the valid code among at least a portion of communication data received on the communication port,
   wherein the safe controller is configured to decode the coded data to extract any device data from the coded data and selectively allow the decoded device data to pass through the data transfer port and the internal data port to the data storage device when the door is in the closed position and only after the valid code is received by the safe controller and decoded from the coded data.

2. A safe in accordance with claim 1, further comprising an input device coupled to the safe controller, wherein the input device may be used to generate the valid code.

3. A safe in accordance with claim 2, wherein the input device is a local input device.

4. A safe in accordance with claim 2, wherein the input device is selected from the group consisting of a keypad, a biometric reader, an electronic key reader, a card reader, and a remote control sensor.

5. A safe in accordance with claim 1, wherein the data transfer port and the communications port are combined into the same physical port.

6. A safe in accordance with claim 1, wherein the valid code and the device data are in separate data packets.

7. A safe in accordance with claim 1, further comprising:
   at least one lock mechanism that selectively couples the outer structure to the door,
   wherein the safe controller is coupled to the lock mechanism, and wherein the safe controller, in response at least in part to a communication received on the data transfer port, is configured to selectively control the lock mechanism to a) lock the door to the outer structure when the door is in the closed position or b) unlock the door from the outer structure, to control access to the access opening.

8. A safe in accordance with claim 7, wherein the data transfer port comprises a cable connector passing through at least one of the outer structure and the door.

9. A safe in accordance with claim 7, wherein the data transfer port comprises an optical connector passing through at least one of the outer structure and the door.

10. A safe in accordance with claim 7, wherein the data transfer port comprises an antenna.

11. A safe in accordance with claim 10, wherein the antenna is located outside of the safe.

12. A safe in accordance with claim 10, wherein the antenna is located inside the outer structure and a portion of the data transfer port is accessible inside of the safe.

13. A safe in accordance with claim 10, wherein the antenna is located inside the door and a portion of the data transfer port is accessible inside of the safe.

14. A safe in accordance with claim 1, wherein the safe comprises a fire-resistant safe.

15. A safe in accordance with claim 1, wherein the safe is selected from the group consisting of a non-fire-resistant safe, a crush safe, a water resistant safe, a gun safe, a chest, and a file cabinet safe.

16. A safe in accordance with claim 1, further comprising a local output coupled to the safe controller.

17. A safe in accordance with claim 1, wherein:
   the outer structure includes an outer wall and an inner wall defining a first space therebetween;
   the door includes an outer wall and an inner wall defining a second space therebetween; and
   a fire-resistant insulating material is positioned within the first and second spaces.

18. A safe in accordance with claim 1, further comprising:
   a gasket disposed on one of the outer structure and the door such that an interior space defined by the door and the outer structure is substantially sealed to resist water entry between the outer structure and the door when the door is in the closed position.

19. A safe, comprising:
   an outer structure defining an access opening and an interior compartment;
   a door pivotally coupled to the outer structure and configured for being moved between an opened position and a closed position, wherein the door is positioned in the access opening when in the closed position;
   a data transfer port comprising an external side, an internal side and a communication port, wherein the external side is accessible from outside the safe, wherein the data transfer port is configured to be in communication with a data storage device positioned within the interior compartment of the safe, wherein the data transfer port is configured to receive a valid code and device data, and wherein the valid code and the device data are in separate data packets;
   a safe controller coupled to the internal side of the data transfer port, wherein the safe controller comprises an internal data port accessible from the interior compartment of the safe, and wherein the safe controller is configured to recognize the valid code among at least a portion of communication data received on the communication port, wherein the safe controller is configured to allow at least one device data packet to pass from the external side via the internal side of the data transfer port through to the internal data port following the receipt of at least one valid code packet when the door is in the closed position and only after the least one valid code packet is received by the safe controller.

20. A safe in accordance with claim 19, further comprising an input device coupled to the safe controller, wherein the input device may be used to generate the valid code.

21. A safe in accordance with claim 20, wherein the input device is a local input device.

22. A safe in accordance with claim 20, wherein the input device is selected from the group consisting of a keypad, a biometric reader, an electronic key reader, a card reader, and a remote control sensor.

23. A safe in accordance with claim 19, wherein the data transfer port and the communications port are combined into the same physical port.

24. A safe in accordance with claim 19, further comprising:
at least one lock mechanism that selectively couples the outer structure to the door,
wherein the safe controller is coupled to the lock mechanism, and wherein the safe controller, in response at least in part to a communication received on the data transfer port, is configured to selectively control the lock mechanism to a) lock the door to the outer structure when the door is in the closed position or b) unlock the door from the outer structure, to control access to the access opening.

25. A safe in accordance with claim 24, wherein the data transfer port comprises a cable connector passing through at least one of the outer structure and the door.

26. A safe in accordance with claim 24, wherein the data transfer port comprises an optical connector passing through at least one of the outer structure and the door.

27. A safe in accordance with claim 24, wherein the data transfer port comprises an antenna.

28. A safe in accordance with claim 27, wherein the antenna is located outside of the safe.

29. A safe in accordance with claim 27, wherein the antenna is located inside the outer structure and a portion of the data transfer port is accessible inside of the safe.

30. A safe in accordance with claim 27, wherein the antenna is located inside the door and a portion of the data transfer port is accessible inside of the safe.

31. A safe in accordance with claim 19, wherein the safe comprises a fire-resistant safe.

32. A safe in accordance with claim 19, wherein the safe is selected from the group consisting of a non-fire-resistant safe, a crush safe, a water resistant safe, a gun safe, a chest, and a file cabinet safe.

33. A safe in accordance with claim 19, further comprising a local output coupled to the safe controller.

34. A safe in accordance with claim 19, wherein:
the outer structure includes an outer wall and an inner wall defining a first space therebetween;
the door includes an outer wall and an inner wall defining a second space therebetween; and
a fire-resistant insulating material is positioned within the first and second spaces.

35. A safe in accordance with claim 19, further comprising:
a gasket disposed on one of the outer structure and the door such that an interior space defined by the door and the outer structure is substantially sealed to resist water entry between the outer structure and the door when the door is in the closed position.

* * * * *